United States Patent
Saluja

(10) Patent No.: US 12,056,362 B2
(45) Date of Patent: Aug. 6, 2024

(54) NON-VOLATILE STORAGE DEVICE OFFLOADING OF HOST TASKS

(71) Applicant: Kioxia Corporation, Tokyo (JP)

(72) Inventor: Mohinder Saluja, Cupertino, CA (US)

(73) Assignee: KIOXIA CORPORATION, Tokyo (JP)

( * ) Notice: Subject to any disclaimer, the term of this patent is extended or adjusted under 35 U.S.C. 154(b) by 91 days.

(21) Appl. No.: 17/954,987

(22) Filed: Sep. 28, 2022

(65) Prior Publication Data

US 2024/0103731 A1 Mar. 28, 2024

(51) Int. Cl.
G06F 3/06 (2006.01)

(52) U.S. Cl.
CPC .......... G06F 3/0613 (2013.01); G06F 3/0659 (2013.01); G06F 3/0679 (2013.01)

(58) Field of Classification Search
None
See application file for complete search history.

(56) References Cited

U.S. PATENT DOCUMENTS

| | | | |
|---|---|---|---|
| 9,395,921 B2 | 7/2016 | Lu | |
| 2010/0293440 A1 | 11/2010 | Thatcher et al. | |
| 2015/0142996 A1* | 5/2015 | Lu | G06F 12/0246 710/26 |
| 2015/0143031 A1* | 5/2015 | Lu | G06F 12/0246 711/103 |
| 2016/0306581 A1 | 10/2016 | Belgaied et al. | |
| 2017/0147265 A1 | 5/2017 | Kingdon et al. | |
| 2019/0205244 A1 | 7/2019 | Smith | |
| 2020/0042215 A1 | 2/2020 | Roberts | |
| 2021/0397373 A1 | 12/2021 | Muthiah | |

FOREIGN PATENT DOCUMENTS

| | | |
|---|---|---|
| TW | 201727653 A | 8/2017 |
| TW | 201732612 A | 9/2017 |

OTHER PUBLICATIONS

Non-Final Office Action in U.S. Appl. No. 17/955,040 dated Feb. 15, 2024.

\* cited by examiner

Primary Examiner — Brian R Peugh
(74) Attorney, Agent, or Firm — Foley & Lardner LLP

(57) ABSTRACT

Various implementations relate to receiving, by a non-volatile memory device from a host, a host command include device context information of non-volatile memory devices. The device context includes an address of a buffer of each non-volatile memory device. In response to receiving the host command, portions of host data are divided among the non-volatile memory devices. The non-volatile memory device sends to the host a transfer request indicating transfer of each portion of the host data to a respective one of the non-volatile memory devices. The non-volatile memory device sends to another non-volatile memory device a peer command based on the device context information.

20 Claims, 17 Drawing Sheets

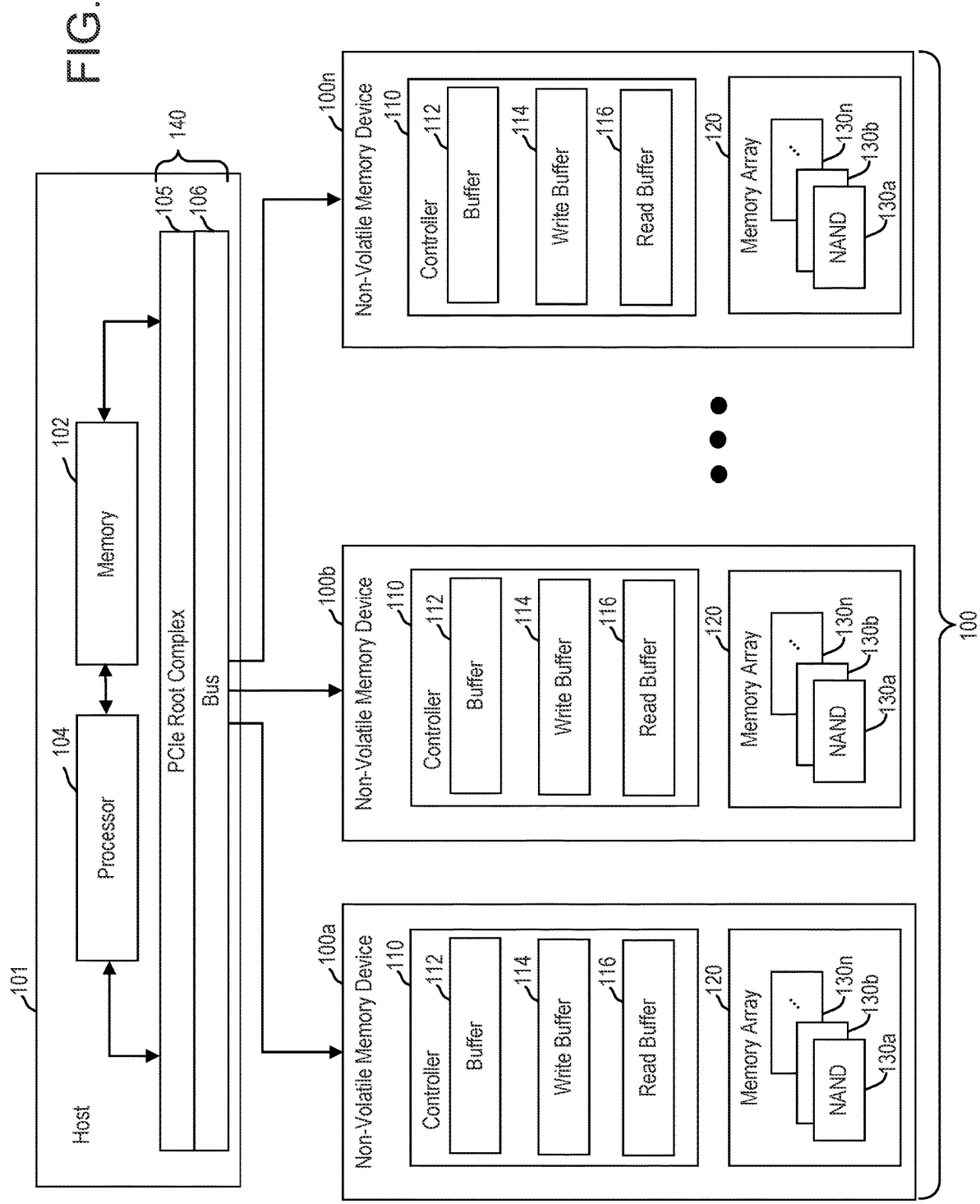

NON-VOLATILE STORAGE DEVICE OFFLOADING OF HOST TASKS

TECHNICAL FIELD

The present disclosure generally relates to systems, methods, and non-transitory processor-readable media for data processing using multiple non-volatile memory devices.

BACKGROUND

A general system that provides data storage can include a host coupled to multiple non-volatile memory devices via a bus such as a Peripheral Component Interconnect Express (PCIe) bus. The host can include a processing unit such as a Central Processing Unit (CPU) coupled a memory unit such as a Dynamic Random Access Memory (DRAM). The CPU is coupled to the bus via a PCIe root complex. Redundant Array of Inexpensive Drives (RAID) can be implemented on the non-volatile memory devices to achieve protection from drive failures.

SUMMARY

Various arrangements disclosed herein relate to systems, methods, apparatuses, and non-transitory processor-readable media for receiving, by a first non-volatile memory device from a host, a host command comprising device context information of a second non-volatile memory device, wherein the device context comprises an address of a buffer of the second non-volatile memory device, transferring, by the first non-volatile memory device, data corresponding to the host command from the host to a buffer of the first non-volatile memory device, and sending, by the first non-volatile memory device to the second non-volatile memory device, a peer command based on the device context information.

BRIEF DESCRIPTION OF THE FIGURES

FIG. 1 shows a block diagram of examples of a system including non-volatile memory devices and a host, according to some implementations.

DETAILED DESCRIPTION

Figure 2B:
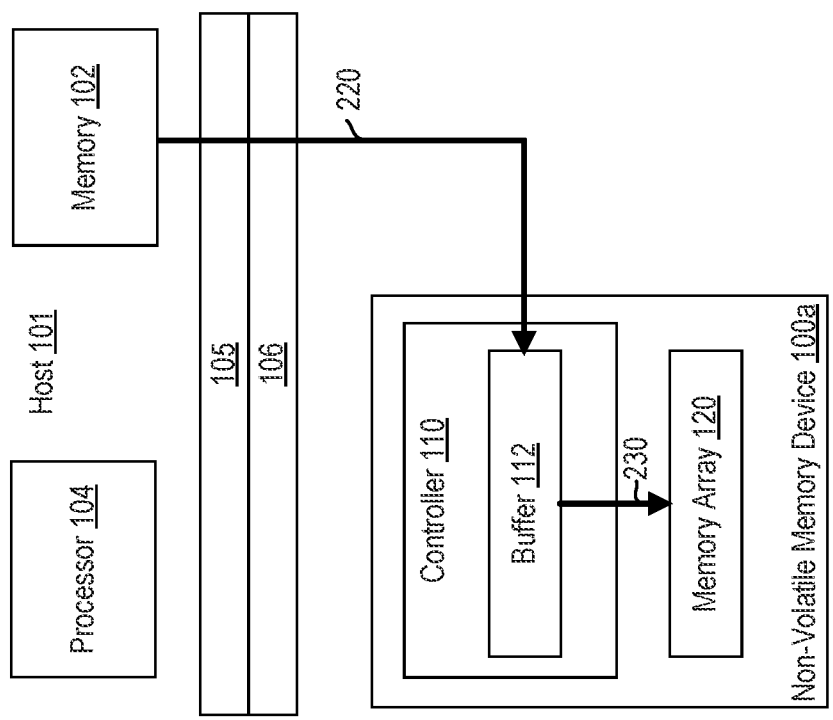
FIGS. 2A, 2B, 2C, and 2D are schematic diagrams illustrating an example replication method according to various arrangements.
Figure 2A:
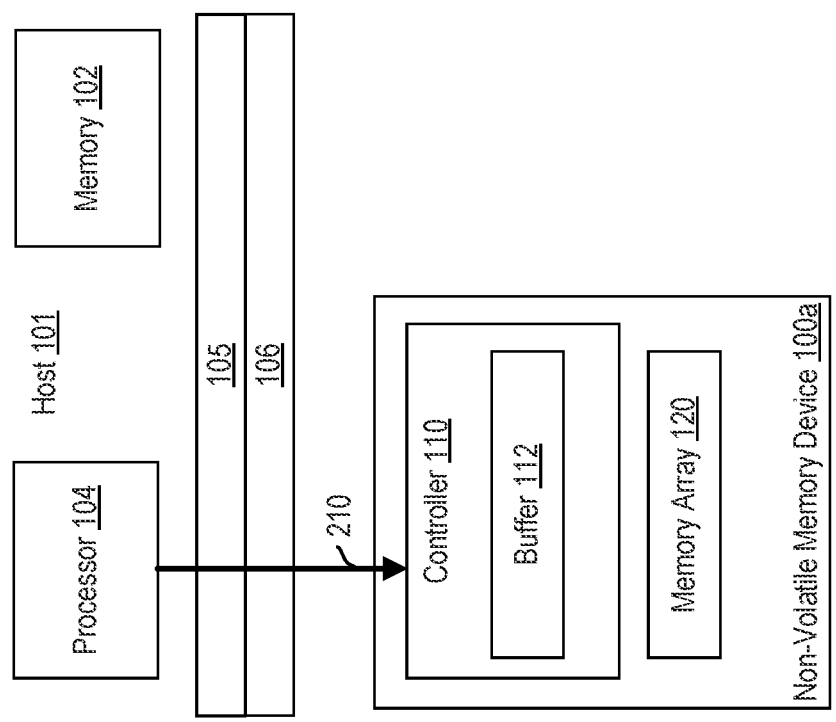
Figure 2C:
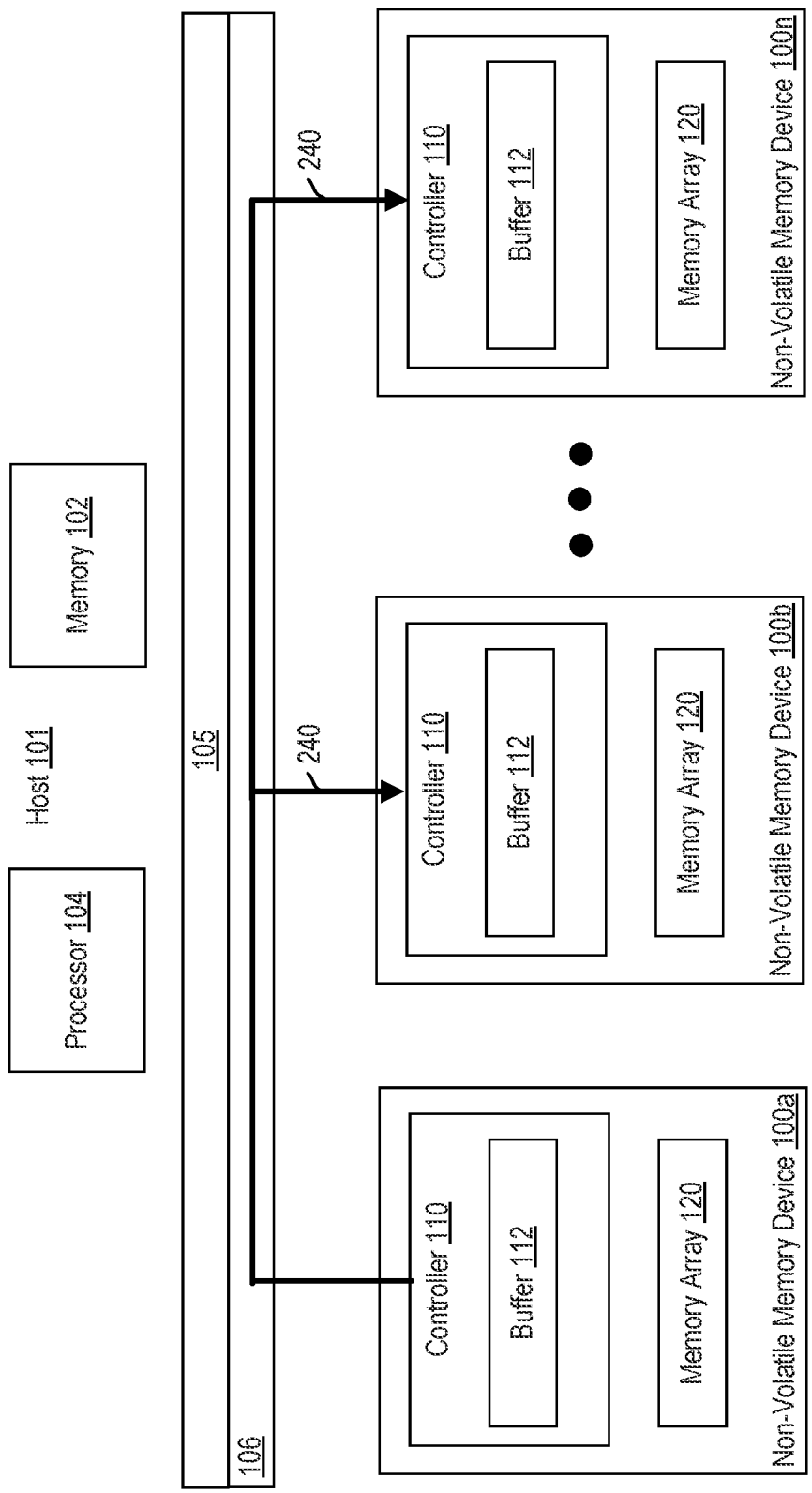
Figure 2D:
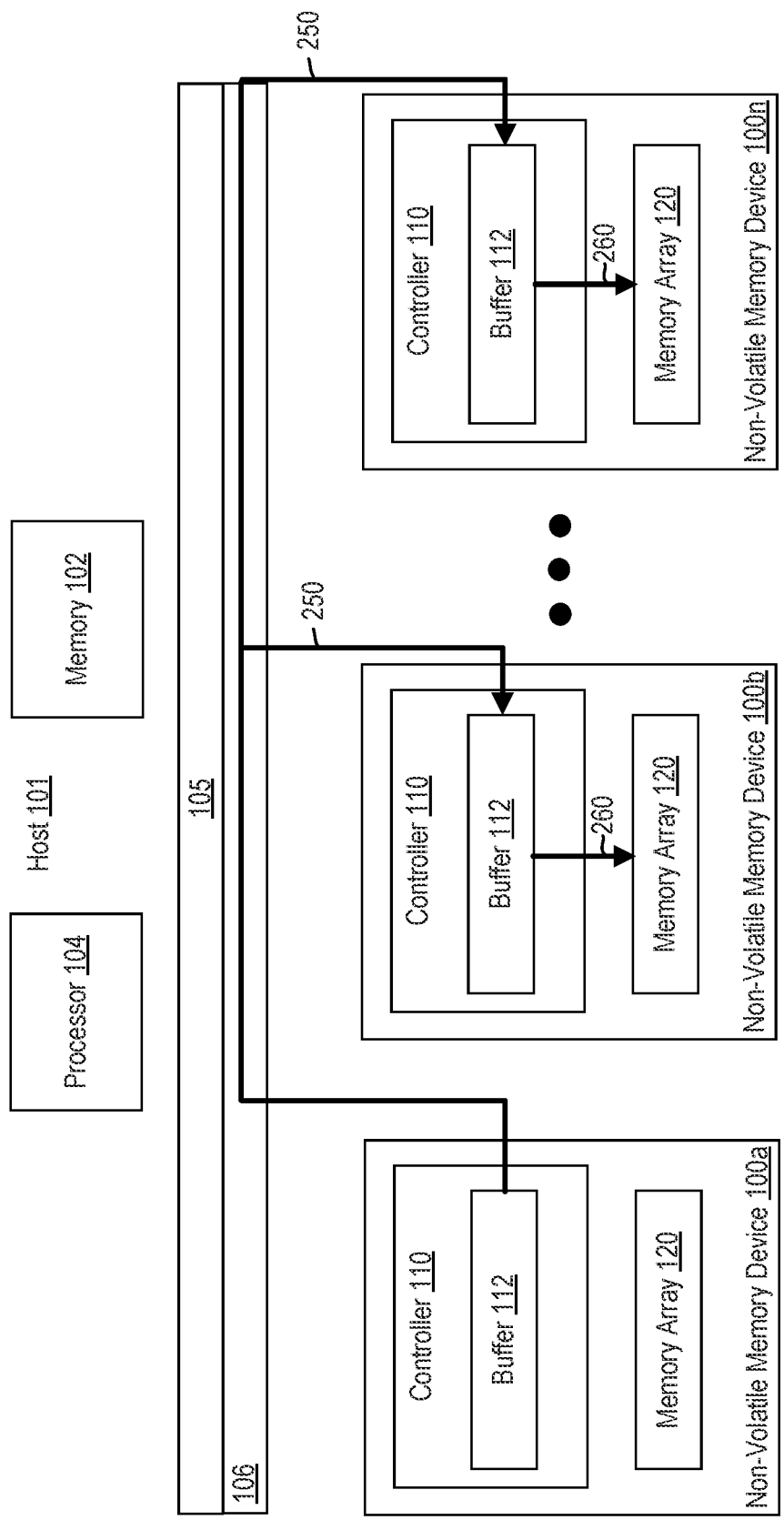

The host includes a CPU and memory device such as DRAM. The host can be coupled to multiple non-volatile memory devices via a bus (e.g., PCIe bus) and PCIe root complex. The PCIe root complex provides the CPU of the host with knowledge of addresses of all non-volatile memory devices attached to the bus. The CPU can explicitly instruct the non-volatile memory devices to perform various operations. Non-trivial data communications between the CPU of the host and a non-volatile memory device can be performed using the memory device of the host. Such non-trivial data communications have to traverse across the interface (e.g., the bus and the PCIe root complex). Conventionally, the non-volatile memory devices do not communicate with each other, and for a write operations, the CPU of the host issues a write command to each of the non-volatile memory devices. In response to the write command, each of the non-volatile memory devices performs a DMA transfer from the same DRAM of the host to write the data to the non-volatile storage (e.g., flash media) of each of the non-volatile memory devices. Each time a non-volatile memory device performs a DMA transfer, data has to pass across the PCIe root complex and the bus.

The controller of a non-volatile memory device has processing capabilities (e.g., a CPU), a Direct Memory Access (DMA) engine, and memory, among other elements. Conventional controllers of non-volatile memory devices are not exposed to the host, and the non-volatile memory devices are not directly addressable.

The arrangements disclosed herein allow the non-volatile memory devices to be directly addressable by the host and other devices. In some examples, the Controller Memory Buffer (CMB), Subsystem Level Memory (SLM), or Persistent Memory Region (PMR) can be implemented to allow the non-volatile memory devices to be directly addressable by the host and other devices. Such implementations allow improved autonomy to the non-volatile memory devices and relieve the CPU of the host of some of the burdens of managing the non-volatile memory. The CPU costs on the host side to manage the non-volatile memory devices can be accordingly reduced, and bottlenecks in the data path can be reduce.

In some arrangements, the processor (e.g., CPU) of the host, being configured by device driver code running thereon, issues a command to at least one of multiple non-volatile memory devices. The command includes device context information (e.g., a set of device contexts) that instructs one or more of the at least one of multiple non-volatile memory devices on how to operate other ones of the multiple non-volatile memory devices. In some examples, the device context information can specify one or more methods for contacting at least one of the multiple non-volatile memory devices. The multiple non-volatile memory devices may be parts of a RAID protection scheme.

FIG. 1 shows a block diagram of a system including non-volatile memory devices 100a, 100b, . . . , 100n (collectively, non-volatile memory devices 100) coupled to a host 101 according to some examples. The host 101 can be a user device operated by a user or an autonomous central controller of the non-volatile memory devices 100, where the host 101 and non-volatile memory devices 100 correspond to a storage subsystem or storage appliance. Examples of such a storage subsystem or appliance include an All Flash Array (AFA) or a Network Attached Storage (NAS) device. As shown, the host 101 includes a memory 102, a processor 104, and an bus 106. The processor 104 is operatively coupled to the memory 102. The processor 104 and the memory 102 are operatively coupled to the bus 106 through a root complex 105. The processor 104 is sometimes referred to as a CPU of the host 101, and configured to perform processes of the host 101 as described herein.

The memory 102 is a local memory of the host 101. In some examples, the memory 102 is or includes a buffer, sometimes referred to as a host buffer. In some examples, the memory 102 includes at least one of a volatile storage or non-volatile persistent storage. Examples of the memory 102 include but are not limited to, Random Access Memory (RAM), DRAM, Static RAM (SRAM), Magnetic RAM (MRAM), Phase Change Memory (PCM), and so on.

The bus 106 includes one or more of software, firmware, and hardware that allows the processor 104, network cards, storage devices, the memory 102, graphic cards, the non-volatile memory devices 100, and so on to communicate with each other. In some examples, the non-volatile memory devices 100 are directly attached or communicably coupled to the bus 106. The bus 106 is one or more of a serial, a PCIe bus or network, an internal switch (e.g., PCIe switch), and so on.

In some examples, the root complex 105 (e.g., PCIe root complex) includes one or more of software, firmware, and hardware that connect to the memory 102 and the processor 104 to the bus 106. In that regard, the root complex 105 can include at least one of one or more controllers, one or more physical connectors, one or more data transfer protocols including namespaces, one or more ports, one or more switches, one or more bridges, one or more transport mechanisms, connectivity thereof, and so on. The root complex 105 can create transaction requests for operation tasks of the processor 104 and send the same to the non-volatile memory devices 100 via the bus 106 according to the addresses of the non-volatile memory devices 100 on the bus 106. In some examples, the root complex 105 can be implemented on the hardware (e.g., chip) of the processor 104. In some examples, the root complex 105 and the bus 106 can be collectively referred to as the interface 140 between the host processor 104/memory 102 and the non-volatile memory devices 100.

During start up, the root complex 105 scans the bus 106 for any attached devices (e.g., physically connected or connected via a network such as a network fabric) and obtain the device addresses of the non-volatile memory devices 100, the processor 104, and the memory 102. In some examples, the root complex 105 scans the bus 106 also for the buffer 112 on the non-volatile memory devices 100. The non-volatile memory devices 100, the buffers 112, and the memory 102 are each assigned an address space within the logical address space of the processor 104. In some examples, SLM and PMR namespaces can be used for addressing the buffers 112. Accordingly, the processor 104 can perform operations such as read and write using the logical address space. The addresses of the buffers 112 are therefore exposed to the processor 104 and the non-volatile memory devices 100. Other methods of exposing the addresses of the buffers 112, such as memory map (e.g., memory-mapped Input/Output (I/O) space) can be likewise implemented. The memory-mapped I/O space allows any memory coupled to the bus 106 to be mapped to a address recognizable by the processor 104.

The processor 104 can execute an Operating System (OS), which provides a filesystem and applications which use the filesystem. The processor 104 can communicate with the non-volatile memory devices 100 (e.g., a controller 110 of each of the non-volatile memory devices 100) via a communication link or network. In that regard, the processor 104 can send data to and receive data from one or more of the non-volatile memory devices 100 using the interface 140 to the communication link or network. While the connection between the host 101 and the non-volatile memory devices 100 is shown as a direct link, in some implementations the link may comprise a network fabric which may include networking components such as bridges and switches.

To send and receive data, the processor 104 (the software or filesystem run thereon) communicates with the non-volatile memory devices 100 using a storage data transfer protocol running on the interface 140. Examples of the protocol include but is not limited to, the SAS, Serial ATA (SATA), and NVMe protocols. In some examples, the interface 140 includes hardware (e.g., controllers) implemented on or operatively coupled to the bus 106, the non-volatile memory devices 100 (e.g., the controllers 110), or another device operatively coupled to the bus 106 and/or the non-volatile memory device 100 via one or more suitable networks. The interface 140 and the storage protocol running thereon also includes software and/or firmware executed on such hardware.

In some examples the processor 104 can communicate, via the bus 106 and a network interface, with a communication network. Other host systems or non-volatile memory devices attached or communicably coupled to the communication network can communicate with the host 101 using a suitable network storage protocol, examples of which include, but are not limited to, NVMe over Fabrics (NVMeoF), Internet Small Computer System Interface (iSCSI), Fibre Channel (FC), Network File System (NFS), Server Message Block (SMB), and so on. The network interface allows the software (e.g., the storage protocol or filesystem) running on the processor 104 to communicate with the external hosts attached to the communication network via the bus 106. In this manner, network storage commands may be issued by the external hosts and processed by the processor 104, which can issue storage commands to the non-volatile memory devices 100 as needed. Data can thus be exchanged between the external hosts and the non-volatile memory devices 100 via the communication network.

In some examples, the non-volatile memory devices 100 are located in a datacenter (not shown for brevity). The datacenter may include one or more platforms or rack units, each of which supports one or more storage devices (such as but not limited to, the non-volatile memory devices 100). In some implementations, the host 101 and non-volatile memory devices 100 together form a storage node, with the host 101 acting as a node controller. One or more storage nodes within a platform are connected to a Top of Rack (TOR) switch, each storage node connected to the TOR via one or more network connections, such as Ethernet, Fiber Channel or InfiniBand, and can communicate with each other via the TOR switch or another suitable intra-platform communication mechanism. In some implementations, non-volatile memory devices 100 may be network attached storage devices (e.g. Ethernet SSDs) connected to the TOR switch, with host 101 also connected to the TOR switch and able to communicate with the non-volatile memory devices 100 via the TOR switch. In some implementations, at least one router may facilitate communications among the non-volatile memory devices 100 in storage nodes in different platforms, racks, or cabinets via a suitable networking fabric. Examples of the non-volatile memory devices 100 include non-volatile devices such as but are not limited to, Solid State Drive (SSDs), Ethernet attached SSDs, Non-Volatile Dual In-line Memory Modules (NVDIMMs), a Universal Flash Storage (UFS), Secure Digital (SD) devices, Compute Express Link (CXL) devices, and so on.

Each of the non-volatile memory devices 100 includes at least a controller 110 and a memory array 120. Other components of the non-volatile memory devices 100 are not shown for brevity. The memory array 120 includes NAND flash memory devices 130a-130n. Each of the NAND flash memory devices 130a-130n includes one or more individual NAND flash dies, which are NVM capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, non-volatile (battery-backed) DRAM, Magnetic Random Access Memory (MRAM), Phase Change Memory (PCM), Ferro-Electric RAM (FeRAM), and so on. The arrangements described herein can be likewise implemented on memory systems using such memory technologies and other suitable memory technologies.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 130a-130n such that those NAND flash memory devices 130a-130n function logically as a single unit of storage. The controller 110 can include processors, microcontrollers, a buffer memory (e.g., buffer 112, 114, and/or 116), error correction systems, data encryption systems, Flash Translation Layer (FTL) and flash interface modules. Such functions can be implemented in hardware, software, and firmware or any combination thereof. In some arrangements, the software/firmware of the controller 110 can be stored in the memory array 120 or in any other suitable computer readable storage medium.

The controller 110 includes suitable processing and memory capabilities for executing functions described herein, among other functions. As described, the controller 110 manages various features for the NAND flash memory devices 130a-130n including but not limited to, I/O handling, reading, writing/programming, erasing, monitoring, logging, error handling, garbage collection, wear leveling, logical to physical address mapping, data protection (encryption/decryption, Cyclic Redundancy Check (CRC)), Error Correction Coding (ECC), data scrambling, and the like. Thus, the controller 110 provides visibility to the NAND flash memory devices 130a-130n.

The buffer memory is a memory device local to, and operatively coupled to, the controller 110. For instance, the buffer memory can be an on-chip SRAM memory located on the chip of the controller 110. In some implementations, the buffer memory can be implemented using a memory device of the storage device 110 external to the controller 110. For instance, the buffer memory can be DRAM located on a chip other than the chip of the controller 110. In some implementations, the buffer memory can be implemented using memory devices both internal and external to the controller 110 (e.g., both on and off the chip of the controller 110). For example, the buffer memory can be implemented using both an internal SRAM and an external DRAM, which are transparent/exposed and accessible by other devices via the bus 106, such as the host 101 (with the assistance of the root complex 105) and other non-volatile memory devices 100.

In this example, the controller 110 includes an internal processor that uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory. The buffer memory includes at least one of the buffer 112, the write buffer 114, or the read buffer 116.

The controller 110 includes a buffer 112, which is sometimes referred to as a drive buffer, an example of which can be a CMB, SLM, or PMR. Besides being accessible by the controller 110, the buffer 112 can be accessible by other devices, such as the host 101 and other non-volatile memory devices 100a, 100b, 100n, via the bus 106. In that manner, the buffer 112 (e.g., addresses of memory locations within the buffer 112) is exposed across the bus 106, and any device operatively coupled to the bus 106 can issue commands (e.g., read commands, write commands, and so on) using addresses that correspond to memory locations within the buffer 112 in order to read data from those memory locations within the buffer 112 and write data to those memory locations within the buffer 112. In some examples, the buffer 112 is a volatile storage. In some examples, the buffer 112 is a non-volatile persistent storage, which may offer improvements in protection against unexpected power loss of one or more of the non-volatile memory devices 100. Examples of the buffer 112 include but are not limited to, RAM, DRAM, SRAM, MRAM, PCM, and so on. The buffer 112 may refer to multiple buffers each configured to store data of a different type, as described herein.

In some implementations, as shown in FIG. 1, the buffer 112 is a local memory of the controller 110. For instance, the buffer 112 can be an on-chip SRAM memory located on the chip of the controller 110. In some implementations, the buffer 112 can be implemented using a memory device of the storage device 110 external to the controller 110. For instance, the buffer 112 can be DRAM located on a chip other than the chip of the controller 110. In some implementations, the buffer 112 can be implemented using memory devices both internal and external to the controller 110 (e.g., both on and off the chip of the controller 110). For example, the buffer 112 can be implemented using both an internal SRAM and an external DRAM, which are transparent/exposed and accessible by other devices 100 via the bus 106, such as the host 101 and other non-volatile memory devices 100. In this example, the controller 110 includes an internal processor uses memory addresses within a single address space and the memory controller, which controls both the internal SRAM and external DRAM, selects whether to place the data on the internal SRAM and an external DRAM based on efficiency. In other words, the internal SRAM and external DRAM are addressed like a single memory.

In one example concerning a write operation, in response to receiving data from the host 101 (via the host interface 140), the controller 110 acknowledges the write commands to the host 101 after writing the data to a write buffer 114. In some implementations the write buffer 114 may be implemented in a separate, different memory than the buffer 112, or the write buffer 114 may be a defined area or part of the memory comprising buffer 112, where only the CMB, SLM, or PMR part of the memory is accessible by other devices, but not the write buffer 114. The controller 110 can write the data stored in the write buffer 114 to the memory array 120 (e.g., the NAND flash memory devices 130a-130n). Once writing the data to physical addresses of the memory array 120 is complete, the FTL updates mapping between logical addresses (e.g., Logical Block Address (LBAs)) used by the host 101 to associate with the data and the physical addresses used by the controller 110 to identify the physical locations of the data. In another example concerning a read operation, the controller 110 includes another buffer 116 (e.g., a read buffer) different from the buffer 112 and the buffer 114 to store data read from the memory array 120. In some implementations the read buffer 116 may be implemented in a separate, different memory than the buffer 112, or the read buffer 116 may be a defined area or part of the memory comprising buffer 112, where only the CMB, SLM, or PMR part of the memory is accessible by other devices, but not the read buffer 116.

While non-volatile memory devices (e.g., the NAND flash memory devices 130a-130n) are presented as examples herein, the disclosed schemes can be implemented on any storage system or device that is connected to the host 101 over an interface, where such system temporarily or permanently stores data for the host 101 for later retrieval.

In some examples, the non-volatile memory devices 100 form a RAID group for parity protection. That is, one or more of the non-volatile memory devices 100 stores parity data (e.g., parity bits) for data stored on those devices and/or data stored on other ones of the non-volatile memory devices 100.

In some implementations, the processor 104 of the host 101 sends a host command to a first non-volatile memory device (e.g., the non-volatile memory device 100a) of the non-volatile memory devices 100, where the host command includes device context information for at least another one of the non-volatile memory devices 100 in the set. The first non-volatile memory device can be referred to as the source device. In addition to executing the host command, the first non-volatile memory device is also responsible for executing this command on at least another one of the non-volatile memory devices 100, while containing all further communication within the PCIe subsystem without reaching the processor 104 or the memory 102.

Figure 2E:
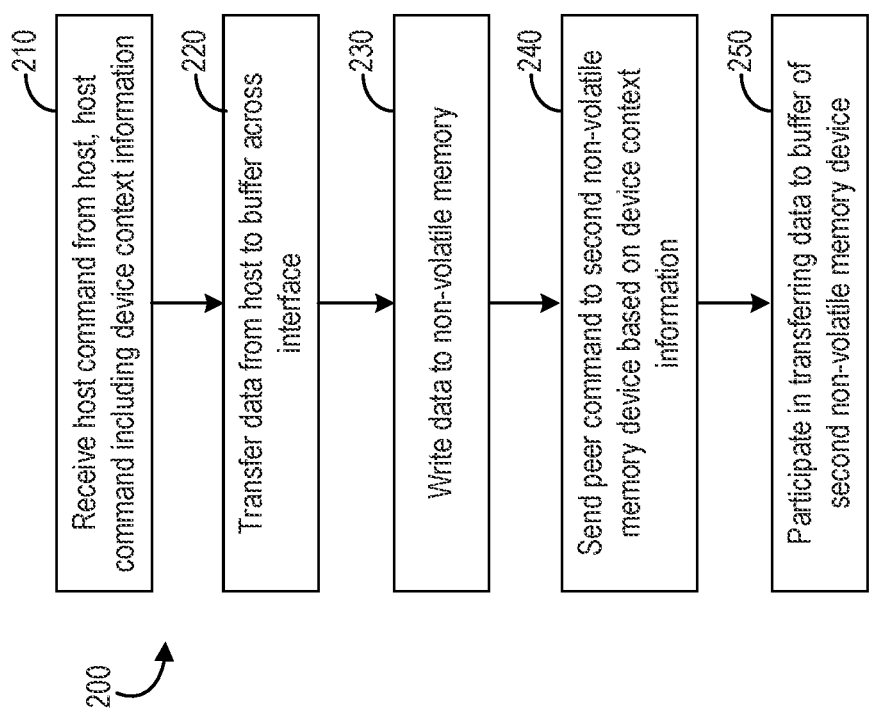
FIG. 2E is a flowchart diagram illustrating the replication method according to various arrangements.

FIGS. 2A, 2B, 2C, and 2D are schematic diagrams illustrating an example replication method 200 according to various arrangements. FIG. 2E is a flowchart diagram illustrating the replication method 200 according to various arrangements. FIGS. 2A-2E show elements of the non-volatile memory devices 100 and the host 101 in FIG. 1, with certain elements omitted in FIGS. 2A-2E for clarity. In some examples, the method 200 relates to a replication operation where data from the host is replicated across multiple non-volatile memory devices 100a-100n. The method 200 shown in FIG. 2E can be performed by the non-volatile memory device 100a.

At 210, the controller 110 of a first non-volatile memory device (e.g., the non-volatile memory device 100a) receives a host command from the host 101, via the interface 140 including the root complex 105 and the bus 106. In some examples, the host command is a write command (e.g., a first write command) addressed to the non-volatile memory device 100a (e.g., its buffer 112). The root complex 105 can route the host command to the controller 110 of the non-volatile memory device 100a on the bus 106 using the address of the non-volatile memory device 100a (e.g., its buffer 112). The host command includes an address of the memory 102. The address of the memory 102 of the host 101 includes a buffer address, an address descriptor, an identifier, a pointer, or another suitable indicator that identifies the memory 102 of the host 101.

The host command includes the device context information, which can be a data structure including various information related to at least one other non-volatile memory device (e.g., the addresses of the non-volatile memory devices 100b-100n), referred to as a second non-volatile memory device. The second non-volatile memory device can be referred to as a source non-volatile memory device. In some examples, the device context information can include an address of second non-volatile memory device.

In some examples, the device context information can include an address of the buffer 112 of the second non-volatile memory device. The address of the buffer 112 can be a CMB address, a SLM address, a PMR address, an address descriptor, an identifier, a pointer, or another suitable indicator that identifies the buffer 112 of that non-volatile memory device. The addresses of the buffers 112 of the non-volatile memory devices 100 are stored within a shared address register (e.g., a shared PCIe Base Address Register) known to the host 101 through the root complex 105. The addresses can be used to send data, instructions, commands, and so on the bus 106. For example, in NVMe, the CMB is defined by a NVMe controller register Controller Memory Buffer Location (CMBLOC) which defines the PCI address location of the start of the CMB and a controller register Controller Memory Buffer Size (CMBSZ) which defines the size of the CMB. The SLM address and the PMR address can be similarly implemented. These controller registers can reside in the root complex 105, the bus 106, or another suitable entity coupled to the root complex 105.

In some examples, the device context information can include permission information of at least one of the second non-volatile memory device or its buffer 112. The permission information of at least one of the second non-volatile memory device or its buffer 112 includes information related to whether or how the first non-volatile memory device can access at least one of the second non-volatile memory device or its buffer 112. For example, the permission information can include one or more types of operations or tasks (e.g., read, write, replication, propagation, division, reduction, etc.) for which the at least one of the second non-volatile memory device or its buffer 112 can be accessed. The permission can include authentication credentials used to access the at least one of the second non-volatile memory device or its buffer 112, such that after the first non-volatile memory device provides the authentication credentials (along with any commands or instructions described herein) to the at least one of the second non-volatile memory device or its buffer 112, the second non-volatile memory device can perform operations according to the commands or instructions. In some examples, the authentication credentials can be implemented using a security token. The security token can be separately issued for different operations and tasks. In some examples, the authentication credentials can be implemented using an access control list (e.g., a whitelist, a blacklist, or a combination thereof) that specifies whether the first non-volatile memory device can access the second non-volatile memory device, and whether the first non-volatile memory device can access the second non-volatile memory device for certain operations and tasks.

In some examples, the device context information can include priority information for processing the data associated with the host command by the second non-volatile memory device. For example, the priority information can indicate a priority level associated with the data, so that the second non-volatile memory device can prioritize processing the data corresponding to the host command before another data if the data corresponding to the host command has higher priority level than that of the another data (e.g., processing the data associated with the host command faster). The second non-volatile memory device can prioritize processing the another data before processing the data corresponding to the host command if the data corresponding to the host command has a lower priority level than that of the another data (e.g., processing the data associated with the host command slower). In some examples, the priority information can indicate a priority level for the first non-volatile memory device to communicate with the second non-volatile memory device with respect to the data in connection with the host command. For instance, the first non-volatile memory device can prioritize processing the data corresponding to the host command (e.g., sending out the peer command as described herein) before processing another data (e.g., sending out the peer command for the another data) if the data corresponding to the host command has higher priority level than that of the another data (e.g., processing the data associated with the host command faster). The first non-volatile memory device can prioritize processing the another before processing the data corresponding to the host command if the data corresponding to the host command has a lower priority level than that of the another data (e.g., processing the data associated with the host command slower).

At 220, the controller 110 of the non-volatile memory device 100a transfers data corresponding to the host command from the host to the buffer 112 of the non-volatile memory device 100a via the interface 140. For example, the controller 110 of the non-volatile memory device 100a can perform a DMA transfer by issuing a DMA request to the host 101 to transfer the data stored in the memory 102 (e.g., a host buffer) of the host 101 to the buffer 112, where the DMA request includes the address of the memory 102. The PCI root complex 105 can route the DMA request to the memory 102 on the bus 106 using the address of the memory 102.

At 230, the controller 110 of the non-volatile memory device 100a writes the data from the buffer 112 of the non-volatile memory device 100a to the non-volatile memory (e.g., the memory array 120) of the non-volatile memory device 100a. For example, the controller 110 of the non-volatile memory device 100a issues an internal command to write the buffer 112 to its own flash media (e.g., the memory array 120). In some examples, the non-volatile memory device 100a writes the data into the memory array 120 at the same time that other non-volatile memory devices 100b-100n write the data into their respective memory arrays 120, e.g., at 260. In some examples, 230 can occur immediately in response to 220, at the same time as 240, after 240, at the same time as 250, or after 250. In some examples, 230 can occur any time before the data is deleted or erased from the buffer 112.

At 240, the controller 110 of the non-volatile memory device 100a sends a peer command to a second non-volatile memory device (e.g., the non-volatile memory devices 100b-100n) based on the device context information, via the bus 106.

For example, the controller 110 of the non-volatile memory device 100a can send the peer command to the controller 110 of each of the non-volatile memory devices 100b-100n according to (e.g., at) the address of each of the non-volatile memory devices 100b-100n contained in the device context information received from the host 101 at 210.

For example, the controller 110 of the non-volatile memory device 100a can determine, according to the permission information, whether there is permission for the non-volatile memory device 100a to send the peer command to at least one of each of the non-volatile memory devices 100b-100n or its buffer 112 for the type of operation or task (e.g., write or replication) specified in the host command. For example, the controller 110 of the non-volatile memory device 100a can authenticate, using the authentication credentials, with at least one of each of the non-volatile memory devices 100b-100n or its buffer.

For example, the controller 110 of the non-volatile memory device 100a can determine, according to the priority information, the priority level for sending the peer command to each of the non-volatile memory devices 100b-100n. The controller 110 of the non-volatile memory device 100a processes the data or the host command associated higher priority level before processing data or host command associated with a lower priority level. For example, the peer command can include a priority level for processing the data associated with the peer command and the host command. Each of the non-volatile memory devices 100b-100n can process the data or the peer command associated higher priority level before processing data or peer command associated with a lower priority level. The priority level included in the peer command can correspond to the priority level included in the context information of the host command.

The peer command includes another write command (e.g., a second write command). In some examples in which a set of non-volatile memory devices (e.g., RAID-1 devices, such as the non-volatile memory devices 100a-100n) includes n devices, the controller 110 of the non-volatile memory device 100a issues n−1 peer commands to n−1 non-volatile memory devices 100b-100n. In some examples, the peer command includes an address of the data from which the second non-volatile memory device (e.g., the non-volatile memory devices 100b-100n) can transfer the data. The address of the data includes the address of the buffer 112 of the non-volatile memory device 100a, so the second non-volatile memory device (e.g., the non-volatile memory devices 100b-100n) can transfer the data from the buffer 112 of the non-volatile memory device 100a using the address thereof, e.g., at 260.

At 250, the controller 110 of the non-volatile memory device 100a participates transferring the data to the buffer 112 of the second non-volatile memory device from the buffer 112 of the non-volatile memory device 100a, via the bus 106. For example, the controller 110 of the non-volatile memory device 100a exposes its buffer 112 (e.g., the buffer address) to the bus 106 (e.g., to any device such as the non-volatile memory devices 100b-100n coupled or connected to the bus 106). The controller 110 of the second non-volatile memory device (e.g., each of the non-volatile memory devices 100b-100n) perform a DMA transfer by issuing a DMA request to the controller 110 of the non-volatile memory device 100a using the address of the buffer 112 of the non-volatile memory device 100a. In response, the controller 110 of each of the non-volatile memory devices 100b-100n transfers the data stored in the buffer 112 of the non-volatile memory device 100a into the buffer 112 of each of the non-volatile memory devices 100b-100n.

At 260, the controller 110 of the second non-volatile memory device (e.g., each of the non-volatile memory devices 100b-100n) writes the data from the buffer 112 of the second non-volatile memory device to the non-volatile memory (e.g., the memory array 120) of the second non-volatile memory device. For example, the controller 110 of the second non-volatile memory device issues an internal command to write the buffer 112 to its own flash media (e.g., the memory array 120). In some examples, the non-volatile memory devices 100b-100n write the data into their respective memory arrays 120 at the same time, in parallel. In some examples, in response to the controller 110 of the non-volatile memory device 100a receiving write completion confirmation from each of the non-volatile memory devices 100b-100n, the controller 110 of the non-volatile memory device 100a sends a write complete message to the processor 104 across the interface 140.

Accordingly, following 210 and 220, for the transfer of data in replication to the non-volatile memory devices 100b-100n, no requests, commands, or data crosses the root complex 105 to the processor 104 and memory 102 of the host 101. The routing of requests and data among the non-volatile memory devices 100 can be performed via the bus 106 as the root complex 105, which provides an interface to the bus 106 for the processor 104 and memory 102, is not involved. The method 200 can reduce workload of the processor 104 and the memory 102 by delegating repetitive operations across a set of devices 100. The amount of data passing across the root complex 105 can be reduced. The load on system memory 102 can also be reduced.

In some examples, the non-volatile memory devices 100 can be SSDs. In some examples, at least one or two or more of the non-volatile memory devices 100 can be NVMeoF devices, which are attached to the bus 106 via a communication network such as NVMeoF, iSCSI, FC, NFS, SMB, and so on. The NVMeoF devices may have peer-to-peer data transfer capability on NVMeoF target side, without routing communications through the root complex 105.

Figure 3B:
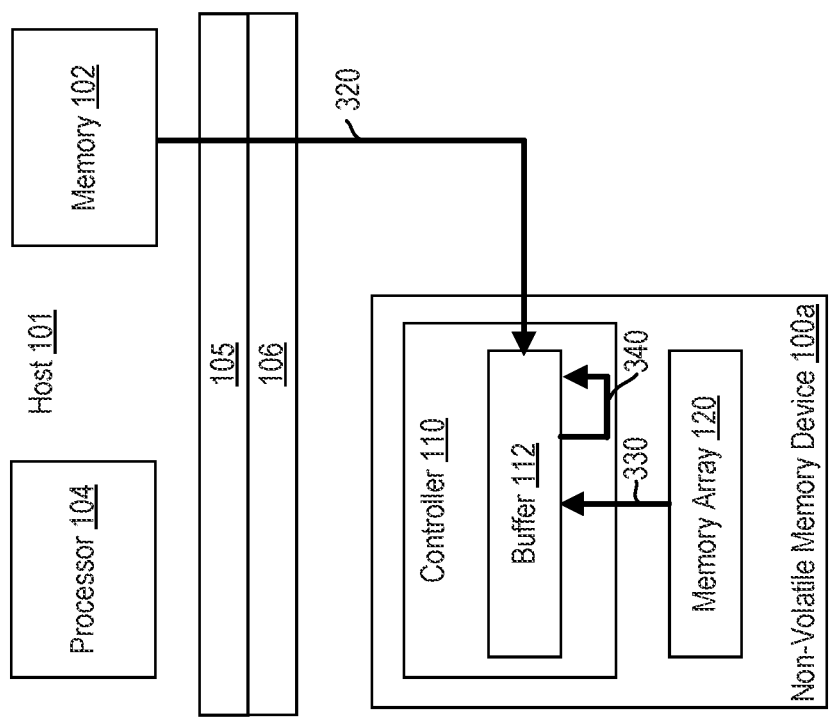
FIGS. 3A, 3B, 3C, 3D, 3E, and 3F are schematic diagrams illustrating an example propagation method according to various arrangements.
Figure 3A:
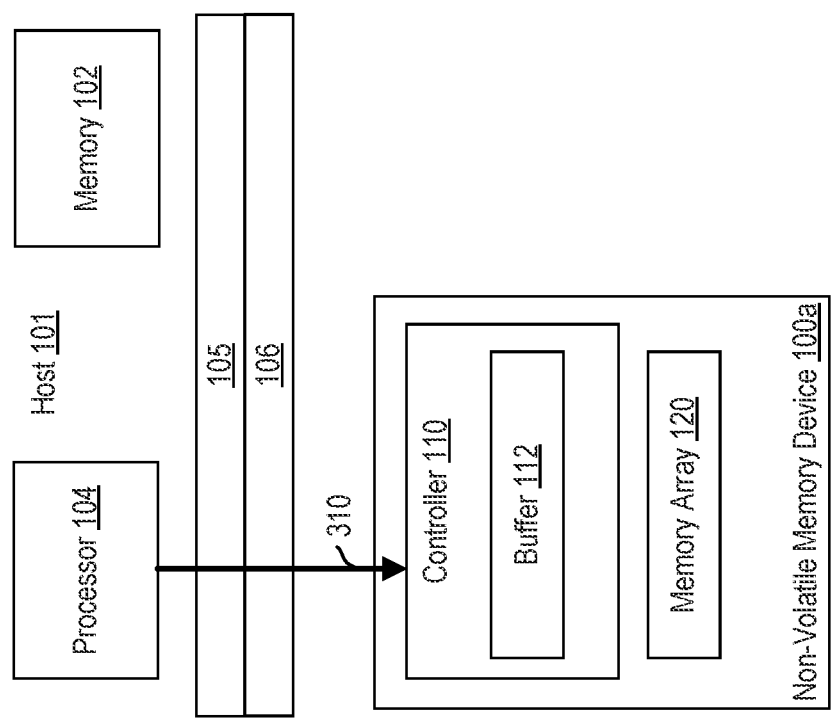
Figure 3C:
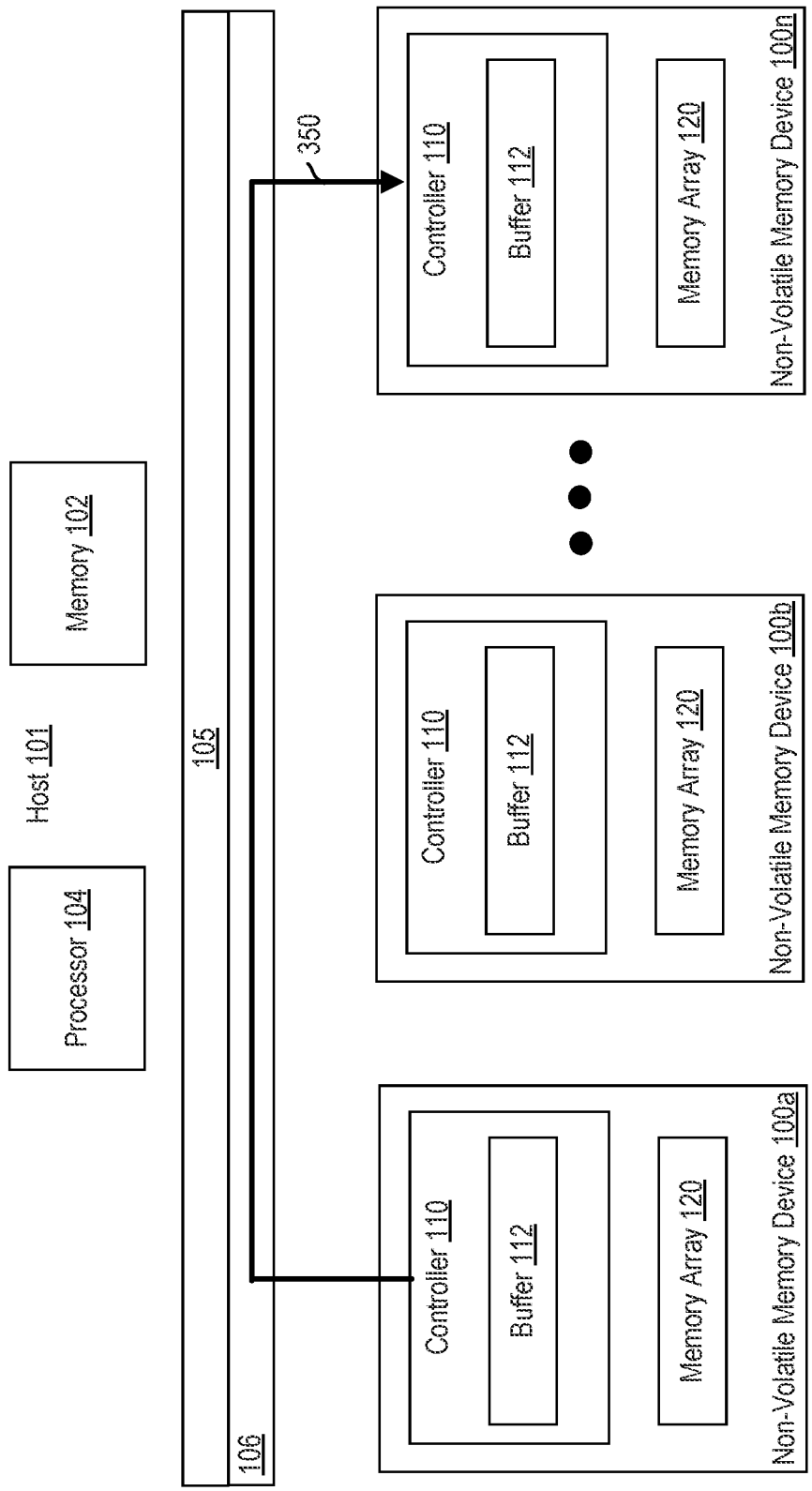
Figure 3D:
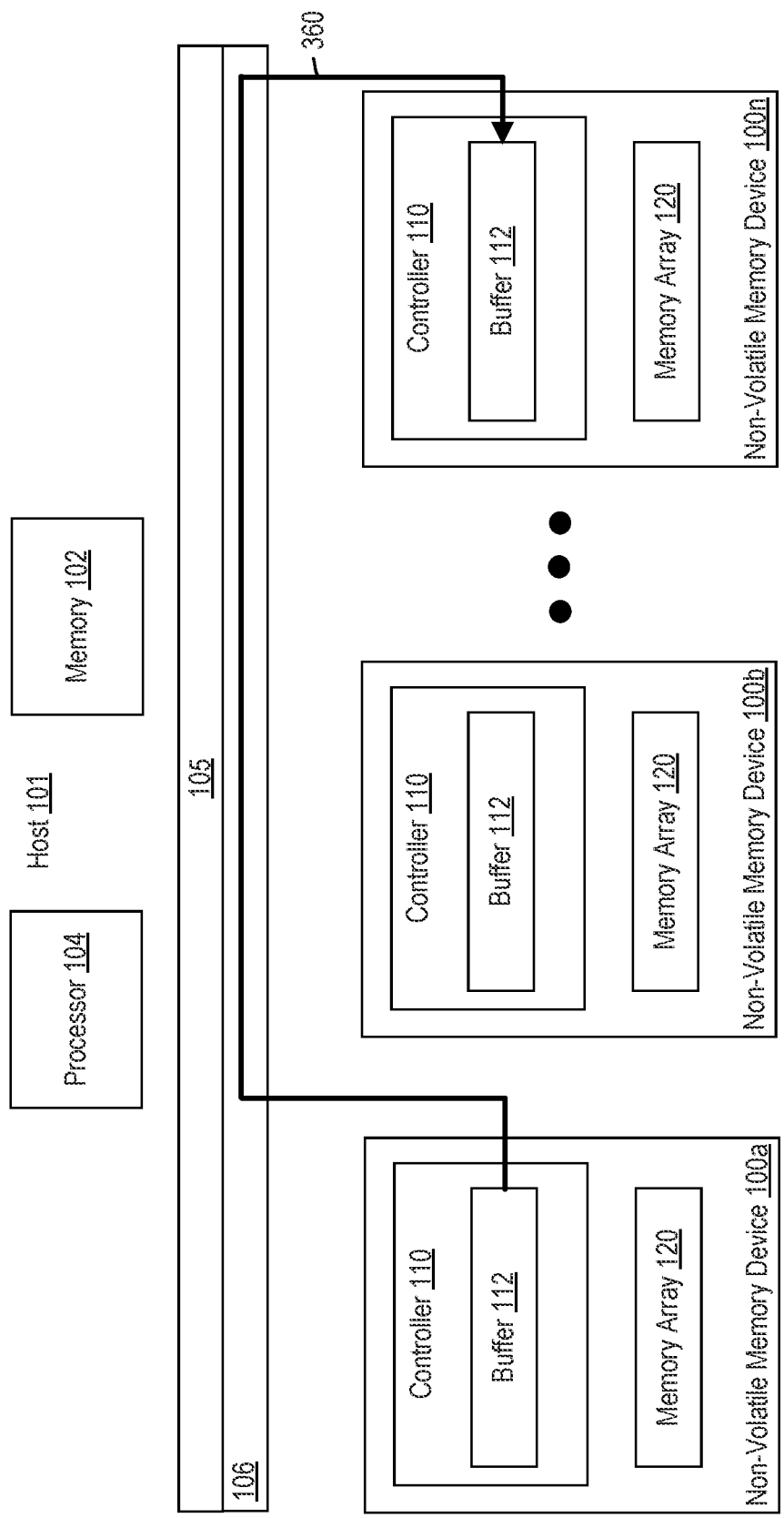
Figure 3E:
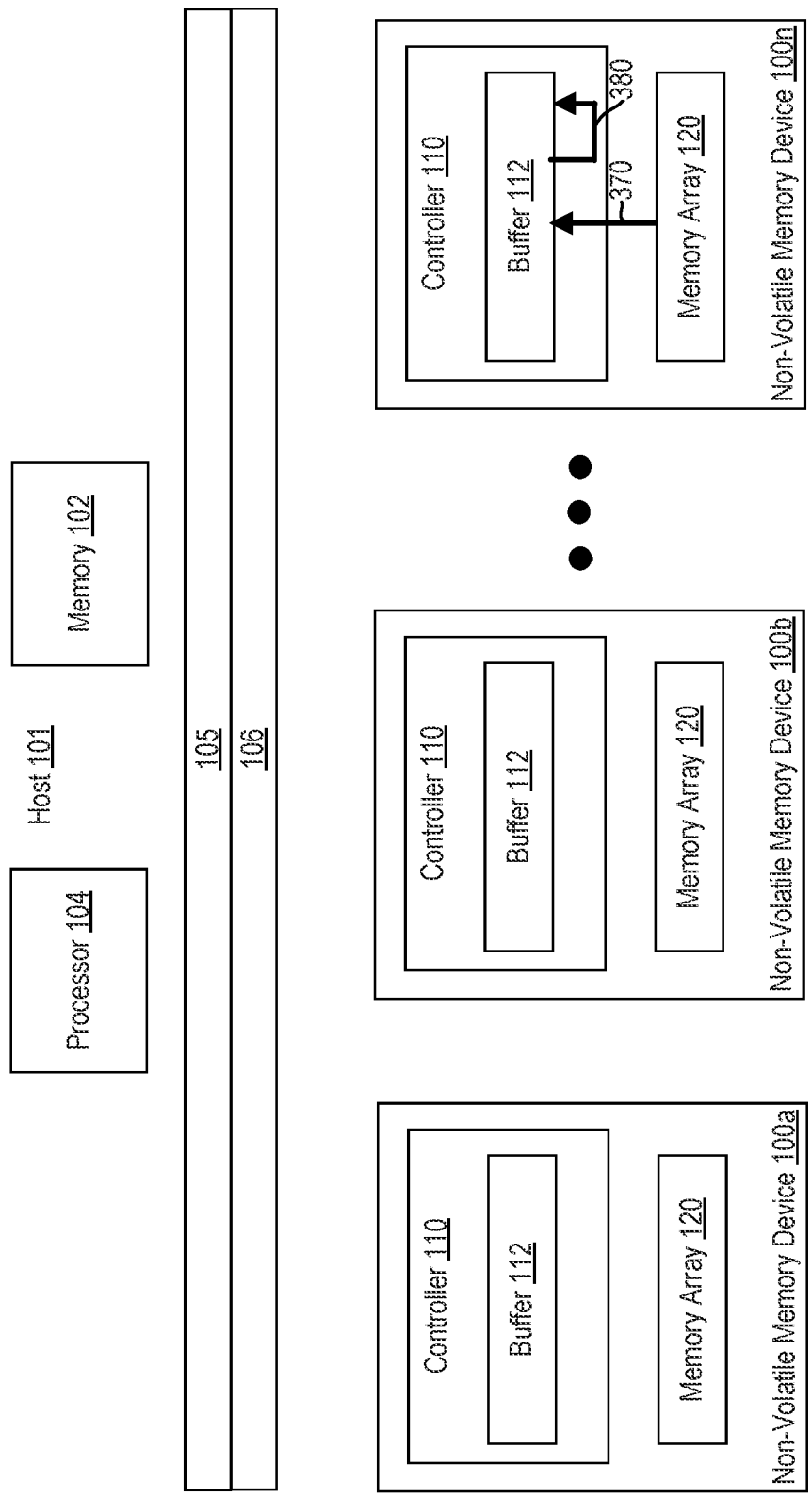
Figure 3F:
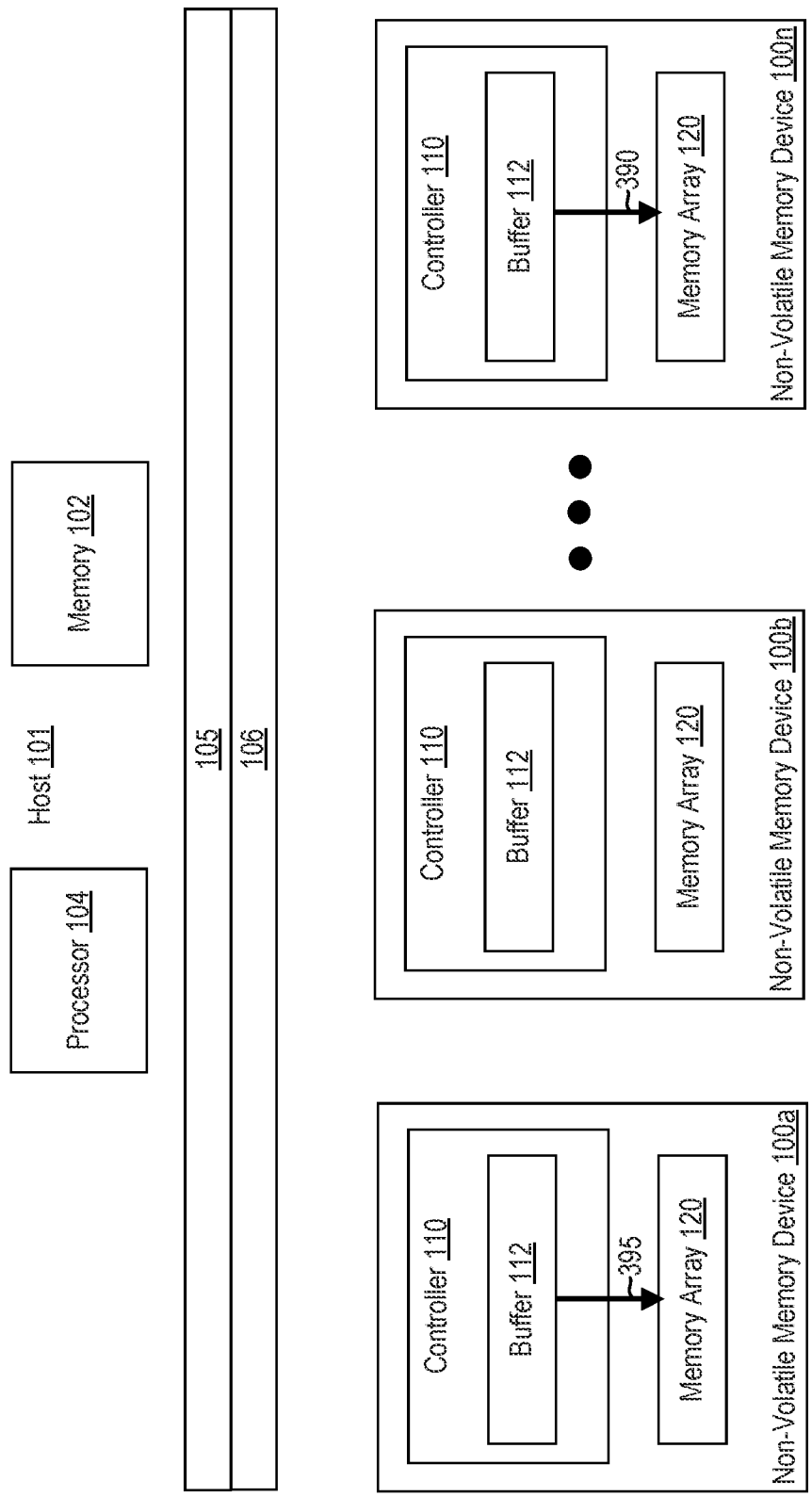
Figure 3G:
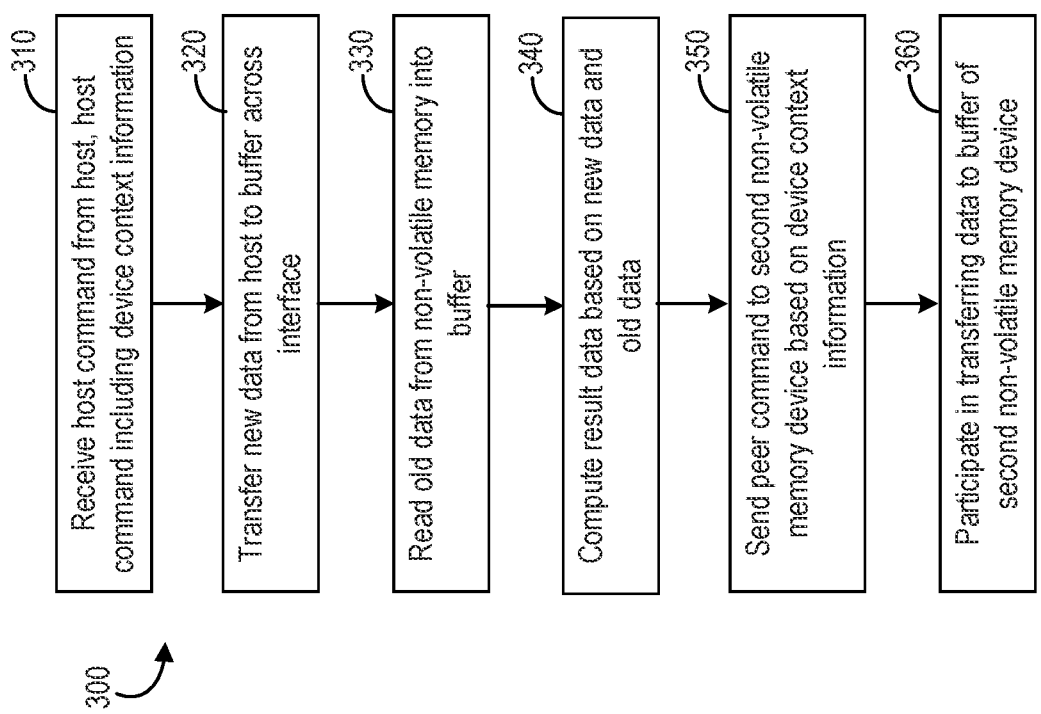
FIG. 3G is a flowchart diagram illustrating the propagation method according to various arrangements.

FIGS. 3A, 3B, 3C, 3D, 3E, and 3F are schematic diagrams illustrating an example propagation method 300 according to various arrangements. FIG. 3G is a flowchart diagram illustrating the propagation method 300 according to various arrangements. FIGS. 3A-3G show elements of the non-volatile memory devices 100 and the host 101 in FIG. 1, with certain elements omitted for clarity. In some examples, the method 300 relates to a propagation operation where the multiple non-volatile memory devices 100a-100n are part of a RAID-5 protection scheme and are a part of a stripe spanning across the non-volatile memory devices 100a-100n. A write update updates a part of the strip that is entirely within the memory array 120 of the non-volatile memory device 100a. The method 300 shown in FIG. 3G can be performed by the non-volatile memory device 100a.

At 310, the controller 110 of a first non-volatile memory device (e.g., the non-volatile memory device 100a) receives a host command from the host 101, via the interface 140 including the root complex 105 and the bus 106. In some examples, the host command is a write command (e.g., a first write command) addressed to the non-volatile memory device 100a (e.g., its buffer 112). The root complex 105 can route the host command to the controller 110 of the non-volatile memory device 100a on the bus 106 using the address of the non-volatile memory device 100a (e.g., its buffer 112). The host command includes an address of the memory 102. The address of the memory 102 of the host 101 includes a buffer address, an address descriptor, an identifier, a pointer, or another suitable indicator that identifies the memory 102 of the host 101.

In some examples, the host command includes the device context information. In some examples, the device context information includes address of at least one other non-volatile memory device (e.g., the address of the parity device, the non-volatile memory device 100n) in the RAID group. The address of a non-volatile memory device can be a CMB address, SLM address, a PMR address, an address descriptor, an identifier, a pointer, or another suitable indicator that identifies the buffer 112 of that non-volatile memory device, as described. In some examples, the host command includes the logical address of the data to be updated. In some examples, the device context information can include permission information of at least one of the second non-volatile memory device or its buffer 112. In some examples, the device context information can include priority information including at least one of a priority level for processing the data associated with the host command by the second non-volatile memory device or a priority level for the first non-volatile memory device to communicate with the second non-volatile memory device with respect to the data in connection with the host command.

At 320, the controller 110 of the non-volatile memory device 100a transfers new data corresponding to the host command from the host to the buffer 112 of the non-volatile memory device 100a via the interface 140. For example, the controller 110 of the non-volatile memory device 100a can perform a DMA transfer by issuing a DMA request to the host 101 to transfer the new data stored in the memory 102 (e.g., a host buffer) of the host 101 to the buffer 112, where the DMA request includes the address of the memory 102. The PCI root complex 105 can route the DMA request to the memory 102 on the bus 106 using the address of the memory 102.

At 330, the controller 110 reads old data corresponding to the logical address included in the host command from the non-volatile memory (e.g., the memory array 120) of the non-volatile memory device 100a into the buffer 112. For example, the controller 110 can determine the physical address mapped to the logical address through suitable Logical-to-Physical (L2P) conversation and read the physical address at the non-volatile memory to obtain the old data and transfer the same to the buffer 112. At 340, the controller 110 computes result data based on at least one of the new data and the old data. For example, the result data can be a bitwise XOR of the old and the new data. The controller 110 stores the result data into the buffer 112 of the non-volatile memory device 100a.

This result data is sent to the member device holding the parity for the stripe (e.g., the non-volatile memory device 100n). At 350, the controller 110 of the non-volatile memory device 100a sends a peer command to a second non-volatile memory device (e.g., the non-volatile memory device 100n) based on the device context information, via the bus 106. The second non-volatile memory device may be the parity device that stores the parity bit. For example, the controller 110 of the non-volatile memory device 100a sends the peer command to the controller 110 of the non-volatile memory device 100n according to (e.g., at) the address of the non-volatile memory device 100n contained in the device context information received from the host 101. The bus 106 can route the peer command to the controller 110 of the non-volatile memory device 100n using the address of the non-volatile memory device 100n (e.g., its buffer 112).

For example, the controller 110 of the non-volatile memory device 100a can determine, according to the permission information, whether there is permission for the non-volatile memory device 100a to send the peer command to the non-volatile memory device 100n or its buffer 112 for the type of operation or task (e.g., write or propagation) specified in the host command. For example, the controller 110 of the non-volatile memory device 100a can authenticate, using the authentication credentials, with at least one of the non-volatile memory device 100n or its buffer.

For example, the controller 110 of the non-volatile memory device 100a can determine, according to the priority information, the priority level for sending the peer command to the non-volatile memory device 100n. The controller 110 of the non-volatile memory device 100a processes the data or the host command associated higher priority level before processing data or host command associated with a lower priority level. For example, the peer command can include a priority level for processing the data associated with the peer command and the host command. The non-volatile memory device 100n can process the data or the peer command associated higher priority level before processing data or peer command associated with a lower priority level. The priority level included in the peer command can correspond to the priority level included in the context information of the host command.

The peer command includes another write command (e.g., a second write command). In some examples, the peer command includes an address of the result data from which the second non-volatile memory device (e.g., the non-volatile memory device 100n) can transfer the result data. The address of the data includes the address of the buffer 112 of the non-volatile memory device 100a, so the second non-volatile memory device can transfer the result data from the buffer 112 of the non-volatile memory device 100a using the address thereof, e.g., at 360.

At 360, the controller 110 of the non-volatile memory device 100a participates transferring the data to the buffer 112 of the second non-volatile memory device from the buffer 112 of the non-volatile memory device 100a, via the bus 106. For example, the controller 110 of the non-volatile memory device 100a exposes its buffer 112 (e.g., the buffer address) to the bus 106 (e.g., to any device such as the non-volatile memory device 100n coupled or connected to the bus 106). The controller 110 of the second non-volatile memory device (e.g., the non-volatile memory device 100n) can perform a DMA transfer by issuing a DMA request to the controller 110 of the non-volatile memory device 100a using the address of the buffer 112 of the non-volatile memory device 100a. In response, the controller 110 of the non-volatile memory device 100n transfers the data stored in the buffer 112 of the non-volatile memory device 100a into the buffer 112 of the non-volatile memory device 100n.

The parity is updated to the bitwise XOR of the result data and the old parity data. For example, at 370, the controller 110 of the non-volatile memory device 100n reads old parity data from the non-volatile memory (e.g., the memory array 120) of the non-volatile memory device 100n into the buffer 112 of the non-volatile memory device 100n. In some examples, the second write command includes the logical address associated with the new data, and the controller 110 of the non-volatile memory device 100n determines the physical address mapped to the logical address through suitable L2P conversation and read the physical address at the non-volatile memory to obtain the old parity data and transfer the same to the buffer 112 of the non-volatile memory device 100n.

At 380, the controller 110 computes new parity data based on at least one of the result data and the old parity data. For example, the new parity data can be a bitwise XOR of the old parity data and the result data. The controller 110 of the non-volatile memory device 100n stores the result data into the buffer 112 of the non-volatile memory device 100n.

At 390, the controller 110 of the second non-volatile memory device (e.g., the non-volatile memory device 100n) writes the new parity data from the buffer 112 of the second non-volatile memory device to the non-volatile memory (e.g., the memory array 120) of the second non-volatile memory device. For example, the controller 110 of the second non-volatile memory device issues an internal command to write the buffer 112 to its own flash media (e.g., the memory array 120).

At 395, the controller 110 of the non-volatile memory device 100a writes the new data from the buffer 112 of the non-volatile memory device 100a to the non-volatile memory (e.g., the memory array 120) of the non-volatile memory device 100a. For example, the controller 110 of the non-volatile memory device 100a issues an internal command to write the buffer 112 to its own flash media (e.g., the memory array 120).

In some examples, the non-volatile memory device 100a writes the new data into the memory array 120 at 395 in parallel with one or more of 360, 370, 380, or 390. In some examples, 395 can occur immediately in response to 320, at the same time as 330, after 330, at the same time as 340, or after 340. In some examples, 395 can occur any time before the new data is deleted or erased from the buffer 112 of the non-volatile memory device 100a.

In some examples, the propagation method 300 can be repeated for at least one additional device such as a third non-volatile memory device, which can be one of non-volatile memory devices 100b-100n-1. In that regard, the second non-volatile memory device becomes the first non-volatile memory device, and the third non-volatile memory device becomes the second non-volatile memory device. The method 300 repeats at 330, with the new data being the data computed at 380. The method 300 can be repeated as the last device in the set (e.g., the RAID group) is reached.

In some examples, in response to the controller 110 of the non-volatile memory device 100a receiving write completion confirmation from the last non-volatile memory device in the set in the propagation chain, the controller 110 of the non-volatile memory device 100a sends a write complete message to the processor 104 across the interface 140. Accordingly, following 310 and 320, for the transfer of data in propagation, no requests, commands, or data crosses the root complex 105 to the processor 104 and memory 102 of the host 101. The routing of requests and data among the non-volatile memory devices 100 can be performed via the bus 106, as the root complex 105, which provides an interface to the bus 106 for the processor 104 and memory 102, is not involved. The method 300 can reduce workload of the processor 104 and the memory 102 by offloading aggregation operations across a set of devices 100. The amount of data passing across the root complex 105 can be reduced. The load on system memory 102 can also be reduced.

Figure 4A:
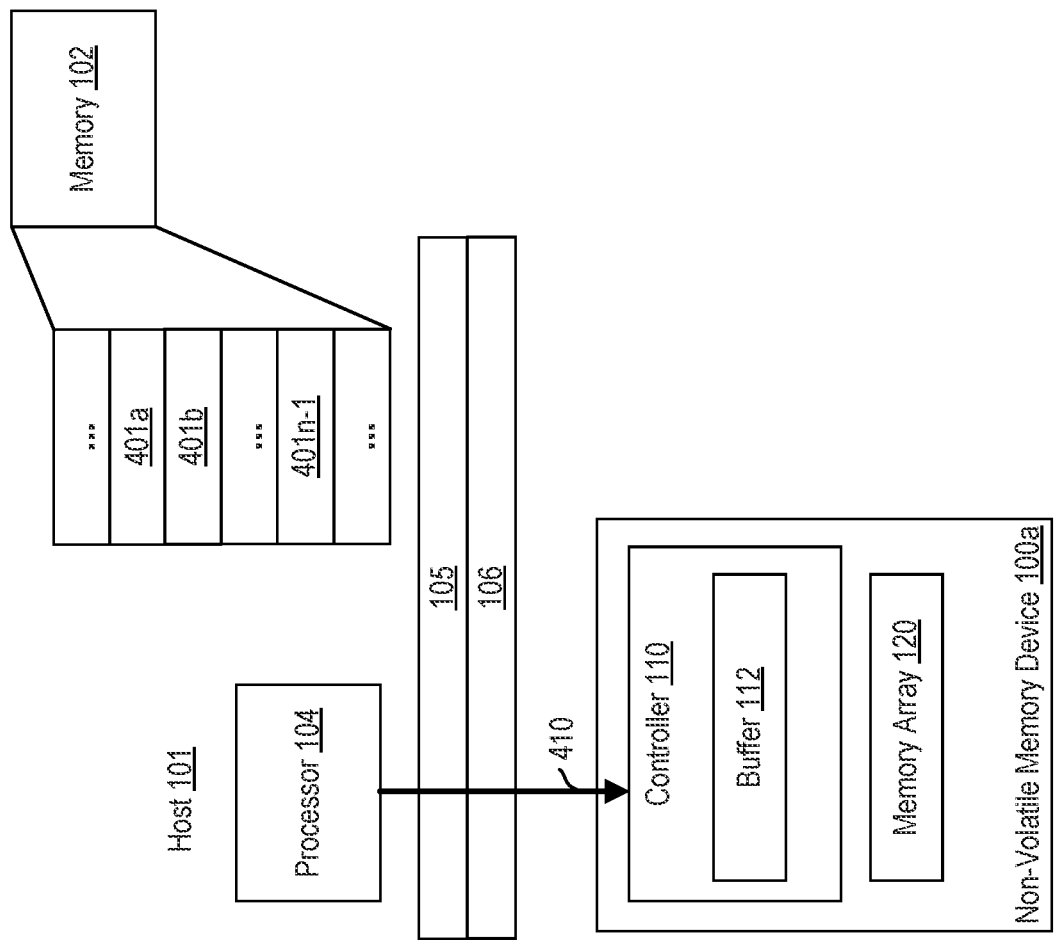
FIGS. 4A, 4B, and 4C are schematic diagrams illustrating an example division method according to various arrangements.
Figure 4B:
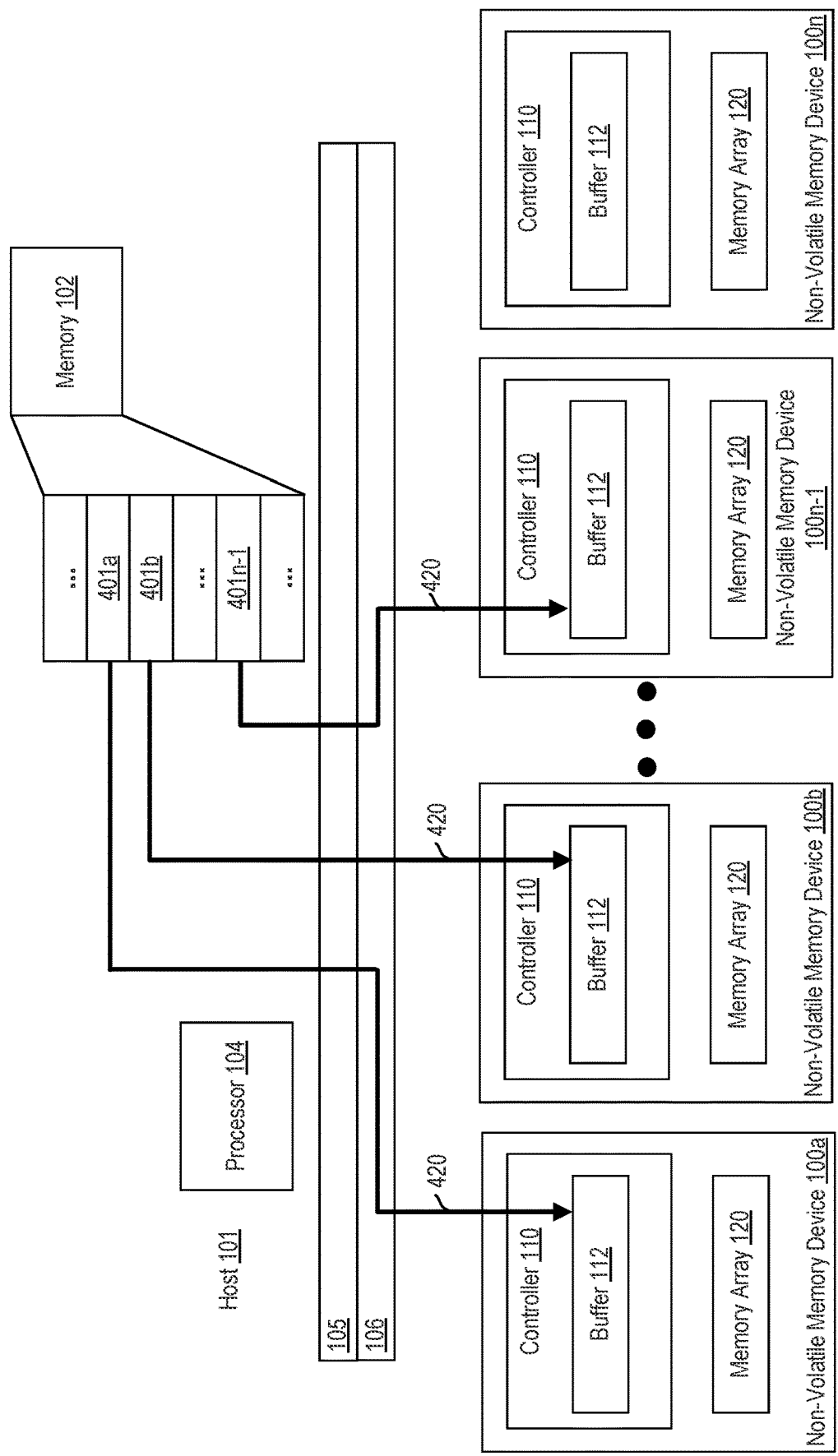
Figure 4C:
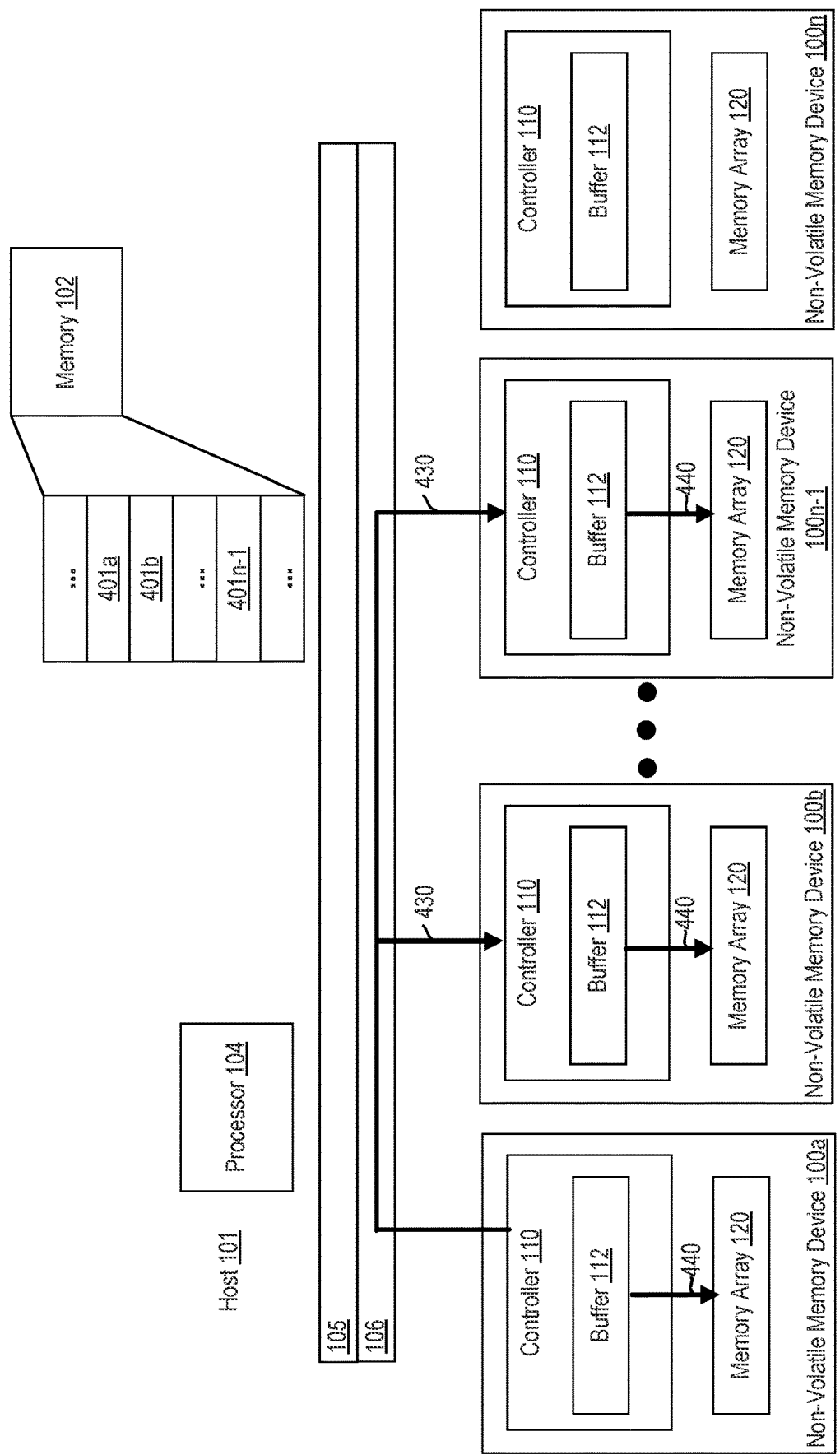
Figure 4D:
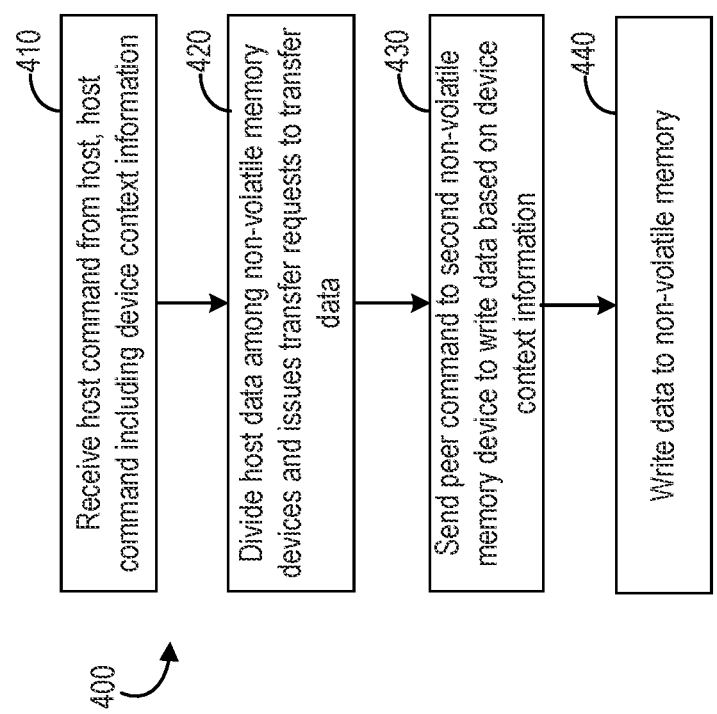
FIG. 4D is a flowchart diagram illustrating the division method according to various arrangements.

FIGS. 4A, 4B, and 4C are schematic diagrams illustrating an example division method 400 according to various arrangements. FIG. 4D is a flowchart diagram illustrating the division method 400 according to various arrangements. FIGS. 4A-4D show elements of the non-volatile memory devices 100 and the host 101 in FIG. 1, with certain elements omitted for clarity. In some examples, the method 400 relates to a division mechanism where a non-volatile memory device (e.g., the non-volatile memory device 100a) of the multiple non-volatile memory devices 100a-100n divide host data among the multiple non-volatile memory devices 100a-100n. The multiple non-volatile memory devices 100a-100n are part of a RAID-5 protection scheme and are a part of a stripe spanning across the non-volatile memory devices 100a-100n. The non-volatile memory device 100n is the parity device that stores the parity bit for the data of the strip stored in the non-volatile memory devices 100a-100n-1. The method 400 shown in FIG. 4D can be performed by the non-volatile memory device 100a. The work includes transferring host data from buffers 401a, 401b, . . . , 401n-1 of the memory 102 into the non-volatile memory devices 100a-100n-1. The method 400 can reduce the load on processor 104 by allowing the division task to be performed by one of the non-volatile memory devices 100a-100n-1.

At 410, the controller 110 of a first non-volatile memory device (e.g., the non-volatile memory device 100a) receives a host command from the host 101, via the interface 140 including the root complex 105 and the bus 106. In some examples, the host command is a write command addressed to the non-volatile memory device 100a (e.g., its buffer 112). The root complex 105 can route the host command to the controller 110 of the non-volatile memory device 100a on the bus 106 using the address of the non-volatile memory device 100a. The host command includes addresses of the buffers 401a, 401b, . . . , 401n-1 of the memory 102, which corresponds to the work that needs to be performed.

In some examples, the host command includes the device context information of a plurality of non-volatile memory devices. In some examples, the device context information includes addresses of the non-volatile memory devices 100a-100n-1 in the RAID group. The address of a non-volatile memory device can be a CMB address, SLM address, a PMR address, an address descriptor, an identifier, a pointer, or another suitable indicator that identifies the buffer 112 of that non-volatile memory device, as described. In some examples, the host command includes the logical address of the data to be updated, including the logical address (e.g., a buffer address) corresponding to each of the buffers 401a-401n-1. In some examples, the device context information can include permission information of at least one of the plurality of non-volatile memory devices or their buffers 112. In some examples, the device context information can include priority information including at least one of a priority level for processing the data associated with the host command by each of the plurality of non-volatile memory devices or a priority level for the first non-volatile memory device to communicate with each of the plurality of non-volatile memory devices with respect to the data in connection with the host command.

At 420, the controller 110 of the first non-volatile memory device (e.g., the non-volatile memory device 100a) divides the host data among non-volatile memory devices and issues transfer requests to transfer the host data into the buffers 112 of the non-volatile memory devices. The non-volatile memory devices can include the non-parity non-volatile memory devices 100a-100n-1 in the RAID group.

In some examples, the controller 110 of the first non-volatile memory device maps each of the addresses of the buffers 401a, 401b, . . . , 401n-1 of the memory 102 to one of the non-parity non-volatile memory devices 100a-100n-1. In the example in which the number of the buffers 401a, 401b, . . . , 401n-1 is the same as the number of the non-parity non-volatile memory devices 100a-100n-1, the controller 110 of the first non-volatile memory device maps the addresses of the buffers 401a, 401b, . . . , 401n-1 of the memory 102 to the non-parity non-volatile memory devices 100a-100n-1 according to an one-to-one relationship. For example, the addresses of the buffers 401a, 401b, . . . , 401n-1 of the memory 102 can be mapped to the non-parity non-volatile memory devices 100a-100n-1 according to an increasing order of the buffer addresses or ID and an order of the non-parity non-volatile memory devices 100a-100n-1 in the RAID group, e.g., the buffer 401a is mapped to non-volatile memory device 100a, the buffer 401b is mapped to non-volatile memory device 100b, . . . , the buffer 401n-1 is mapped to non-volatile memory device 100n-1, and so on. In some examples, the addresses of the buffers 401a, 401b, . . . , 401n-1 of the memory 102 can be mapped to the non-parity non-volatile memory devices 100a-100n-1 according to a decreasing order of the buffer addresses or ID and the order of the non-parity non-volatile memory devices 100a-100n-1 in the RAID group, e.g., the buffer 401a is mapped to non-volatile memory device 100n-1, the buffer 401b is mapped to non-volatile memory device 100n-2, . . . , the buffer 401n-1 is mapped to non-volatile memory device 100a, and so on.

In the example in which the number of the buffers 401a, 401b, . . . , 401n-1 is the less than the number of the non-parity non-volatile memory devices 100a-100n-1, the controller 110 of the first non-volatile memory device maps the addresses of the buffers of the memory 102 to the non-parity non-volatile memory devices based on the increasing or decreasing order of the buffer addresses or ID and the order of the non-parity non-volatile memory devices 100a-100n-1 in the RAID group, where not all of the non-parity non-volatile memory devices 100a-100n-1 in the RAID group is mapped to one of the buffers 401a, 401b, . . . , 401n-1.

In the example in which the number of the buffers 401a, 401b, . . . , 401n-1 is the greater than the number of the non-parity non-volatile memory devices 100a-100n-1, the controller 110 of the first non-volatile memory device maps the addresses of the buffers of the memory 102 to the non-parity non-volatile memory devices based on the increasing or decreasing order of the buffer addresses or ID and the order of the non-parity non-volatile memory devices 100a-100n-1 in the RAID group, where one or more of the non-parity non-volatile memory devices 100a-100n-1 in the RAID group is mapped to two or more of the buffers 401a, 401b, . . . , 401n-1. The mapping can be performed cyclically, e.g., after each of the non-volatile memory devices 100a-100n-1 in the RAID group is mapped to a buffer, the next unmapped buffer is mapped to the non-volatile memory device 100a, and progressing to 100b, 100c, and so on.

The controller 110 of the non-volatile memory device 100a issues transfer requests to transfer the data corresponding to the host data into the buffers 112 of the non-parity non-volatile memory devices based on the division. For example, the non-volatile memory device 100a can issue a first DMA request to the host 101 (e.g., to the memory 102) to transfer the data stored in the buffer 401a to the buffer 112 of the mapped non-volatile memory device (e.g., the non-volatile memory device 100a), issue a second DMA request to the host 101 (e.g., to the memory 102) to transfer the data stored in the buffer 401b to the buffer 112 of the mapped non-volatile memory device (e.g., the non-volatile memory device 100b), . . . , issue an (n−1)th DMA request to the host 101 (e.g., to the memory 102) to transfer the data stored in the buffer 401n-1 to the buffer 112 of the mapped non-volatile memory device (e.g., the non-volatile memory device 100n-1). Each transfer request includes the buffer address of one of the buffers 401a-401n-1 and an address of the buffer 112 of the corresponding non-volatile memory device. The data from the buffers 401a-401n-1 can be accordingly transferred to the buffers 112 according to the DMA requests.

At 430, the controller 110 of the non-volatile memory device 100a sends a peer command to the plurality of non-volatile memory devices (e.g., each of the non-volatile memory devices 100b-100n-1 other than the non-volatile memory device 100a) based on the device context information, via the bus 106. For example, the controller 110 of the non-volatile memory device 100a sends the peer command to the controller 110 of each of the non-volatile memory devices 100b-100n-1 according to (e.g., at) the address of each of the non-volatile memory devices 100b-100n-1 contained in the device context information received from the host 101. The bus 106 can route the peer command to the controller 110 of each of the non-volatile memory devices 100b-100n-1 using the address of the each of the non-volatile memory devices 100b-100n-1 (e.g., its buffer 112).

For example, the controller 110 of the non-volatile memory device 100a can determine, according to the permission information, whether there is permission for the non-volatile memory device 100a to send the peer command to each of the non-volatile memory devices 100b-100n-1 or its buffer 112 for the type of operation or task (e.g., write) specified in the host command. For example, the controller 110 of the non-volatile memory device 100a can authenticate, using the authentication credentials, with each of the non-volatile memory devices 100b-100n-1 or its buffer.

For example, the controller 110 of the non-volatile memory device 100a can determine, according to the priority information, the priority level for sending the peer command to each of the non-volatile memory devices 100b-100n-1. The controller 110 of the non-volatile memory device 100a processes the data or the host command associated higher priority level before processing data or host command associated with a lower priority level. For example, the peer command can include a priority level for processing the data associated with the peer command and the host command. Each of the non-volatile memory devices 100b-100n-1 can process the data or the peer command associated higher priority level before processing data or peer command associated with a lower priority level. The priority level included in the peer command can correspond to the priority level included in the context information of the host command.

The peer command includes another write command (e.g., a second write command) that instructs each of the non-volatile memory devices 100b-100n-1 to write the data corresponding to a respective one of the buffers 401a-401n-1 stored in the buffer 112 to the memory array 120. The peer command can include the address of the buffer 112 of each respective one of the non-volatile memory devices 100b-100n-1.

At 440, the controller 110 of the plurality of non-volatile memory devices 100a-100n-1 writes the data corresponding to respective ones of the buffers 401a-401n-1 stored in the buffers 112 to the memory arrays 120. For example, the controller 110 of each of the non-volatile memory devices 100a-100n-1 issues an internal command to write its buffer 112 to its own flash media (e.g., the memory array 120). In some examples, the non-volatile memory devices 100a-100n-1 write the data into the memory arrays 120 at 440 in parallel.

In some examples, a plurality of non-volatile memory devices can be grouped together, and a leader device can be assigned. In some examples, the grouped plurality of non-volatile memory devices corresponds to a group of non-volatile memory devices 100a-100n that are part of the same RAID group. In some examples, the grouped plurality of non-parity non-volatile memory devices corresponds to a group of non-parity non-volatile memory devices 100a-100n-1 that are part of the same RAID group. The leader devices is the non-volatile memory device 100a in the method 400, shown in FIGS. 4A-4D.

Figure 5A:
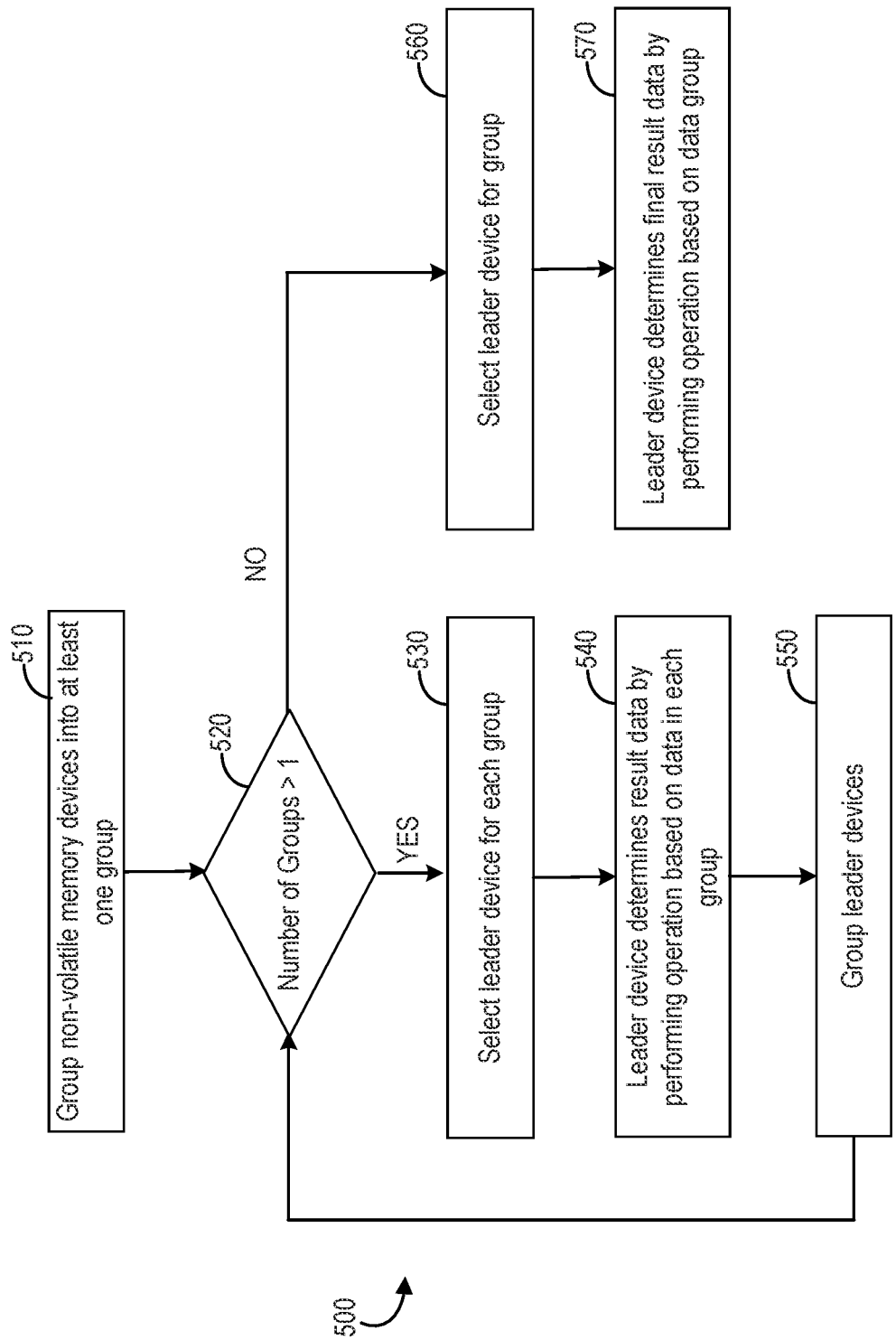
FIG. 5A is a flowchart diagram illustrating an example method for group leader-based computation according to various arrangements.
Figure 5B:
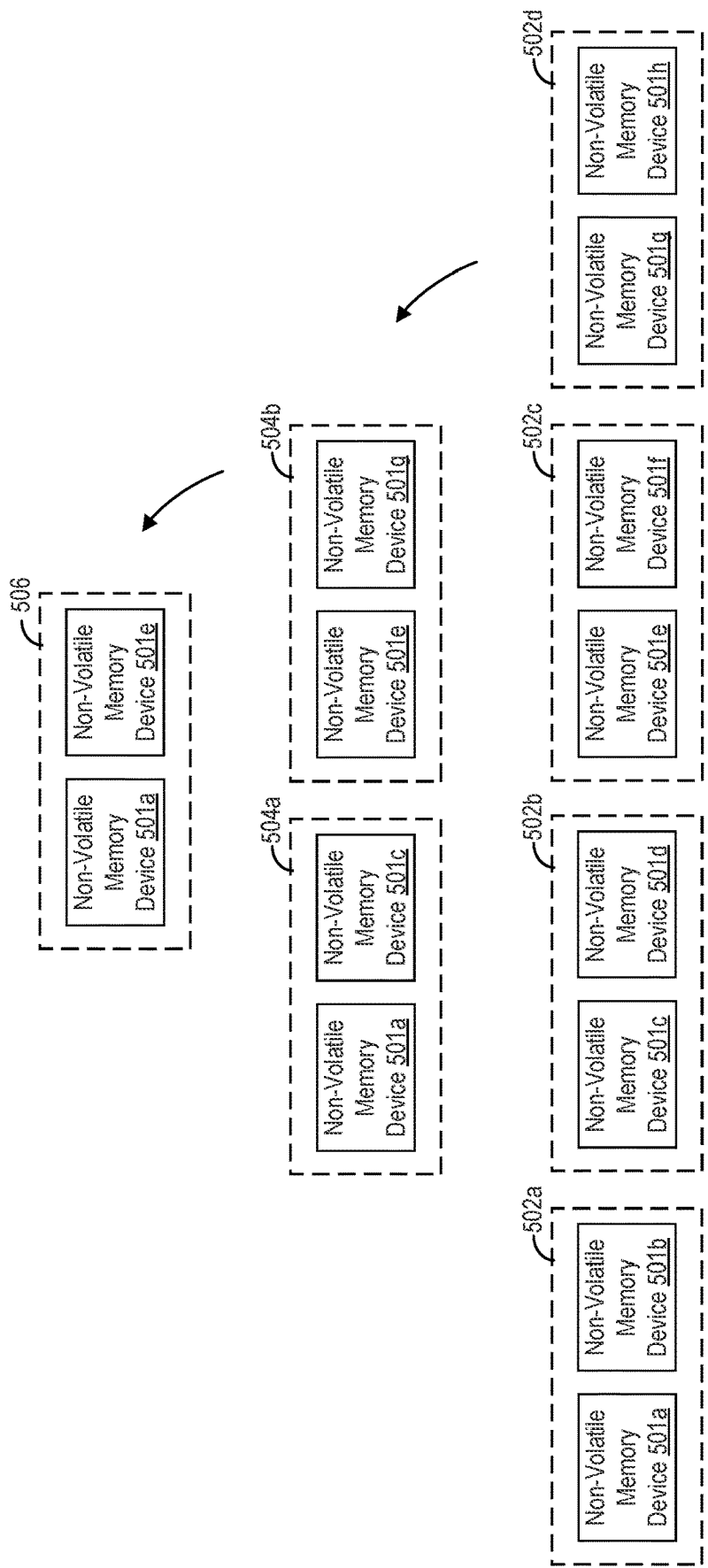
FIG. 5B is a diagram illustrating grouping non-volatile memory devices according to various arrangements.

In some examples, the grouped plurality of non-volatile memory devices can be determined according to any other methods as described herein. FIG. 5A is a flowchart diagram illustrating an example method 500 for group leader-based computation, according to various arrangements. FIG. 5B is a diagram illustrating grouping non-volatile memory devices, according to various arrangements. In FIG. 5B, each the non-volatile memory devices 501a, 501b, 501c, 501d, 501e, 501f, 501g, and 501h can be a non-volatile memory device such as one of the non-volatile memory devices 100a, 100b, 100n. For example, each of the non-volatile memory devices 501a, 501b, 501c, 501d, 501e, 501f, 501g, and 501h can include a controller 110, a buffer 112, and a memory array 120. The method 500 can be performed by the controller 110 of one or more of the non-volatile memory devices 501a, 501b, 501c, 501d, 501e, 501f, 501g, and 501h, the processor 104, or another suitable entity with processing capabilities.

At 510, the plurality of non-volatile memory devices are grouped into at least one group (e.g., at least one first group). For example, the n non-volatile memory devices, which may be part of a RAID group or are non-parity non-volatile memory devices of a RAID group, can be grouped according to an identifier (e.g., 1–n–1) assigned to each non-volatile memory device. For example, the non-volatile memory device 501a is assigned identifier 1, the non-volatile memory device 501b is assigned identifier 2, the non-volatile memory device 501c is assigned identifier 3, the non-volatile memory device 501d is assigned identifier 4, the non-volatile memory device 501e is assigned identifier 5, the non-volatile memory device 501f is assigned identifier 6, the non-volatile memory device 501g is assigned identifier 7, and the non-volatile memory device 501h is assigned identifier 8. Starting from identifier 1, a predetermined number (e.g., 2) of adjacent identifiers are grouped in a same group. For example, the non-volatile memory devices 501a and 501b are grouped into a group 502a. The non-volatile memory devices 501c and 501d are grouped into a group 502b. The non-volatile memory devices 501e and 501f are grouped into a group 502c. The non-volatile memory devices 501g and 501h are grouped into a group 502d. The groups can include any other numbers (e.g., 3 or more) of non-volatile memory devices.

At 520, it is determined whether the number of total groups (e.g., the at least one first group) is a non-zero number that is greater than 1. As shown in FIG. 5B, the number (4) of groups 502a, 502b, 502c, and 502d is greater than 1. In response to determining that the number of total groups is greater than 1 (520: YES), a leader device (e.g., a first leader device) is selected for each group (e.g., from first non-volatile memory devices in each of the at least one first group), at 530. In some examples, the device with an odd identifier (e.g., 1, 3, 5, and 7) in each of the groups 502a, 502b, 502c, and 502d is selected as the leader. Accordingly, the non-volatile memory devices 501a, 501c, 501e, and 501g are selected for the groups 502a, 502b, 502c, and 502d, respectively. In some examples, the device with the even identifier in each group can be selected as the leader. In some examples, the device with the smallest identifier in each group can be selected as the leader. In some examples, the device with the greatest identifier in each group can be selected as the leader.

At 540, the leader device determines the result data by performing at least one operation for the data in each group. For example, the controller 110 of first leader device of each of the at least one first group determines the first result data by performing an operation based on first data from each of the non-volatile memory devices in each of the at least one first group.

For example, a buffer (e.g., the buffer 112) of the first leader device receives the first data from at least one of the first non-volatile memory devices in each of the at least one first group. The controller 110 of the first leader device 501a determines the first result data by computing the first result data based on data stored in the buffer 112 of the first leader device and the first data from at least one of the non-volatile memory devices in each of the at least one first group.

For example, the controller 110 of the first leader device 501a of the group 502a performs a DMA transfer by issuing a DMA request to the controller 110 of a first non-volatile memory device 501b in the group 502a using the address of the buffer 112 of the first non-volatile memory device 501b. The data at the address of the buffer 112 of the first non-volatile memory device 501b can be read from the memory array 120 of the first non-volatile memory device 501b into the buffer 112 of the first non-volatile memory device 501b or can be received by the buffer 112 of the first non-volatile memory device 501b from the memory 102 across the interface 140. In response, the controller 110 of the first leader device 501a transfers the data stored in the buffer 112 of the first non-volatile memory device 501b into the buffer 112 of the first leader device 501a. The controller 110 of the first leader device 501a can read the data stored in the non-volatile memory (e.g., the memory array 120) of the first leader device 501a into the buffer 112 of the first leader device 501a. The controller 110 of the first leader device 501a can perform the operation using the data of the first leader device 501a and the first data from the first non-volatile memory device 501b to determine the first result data. The operation includes an XOR operation where the data of the first leader device 501a is bitwise XORed with the first data from the first non-volatile memory device 501b. The first result data is stored in the buffer 112 of the first leader device 501a. The result data for the groups 502b, 502c, and 502d can be similarly determined by the leader devices 501c, 501e, and 501g, respectively.

In the examples in which there are three or more non-volatile memory devices in the same group, the first result data can be XORed with data from another non-volatile memory devices in the same group to determine an updated result data, which can in turn be XORed with data from another non-volatile memory devices in the same group if any, and so on.

At 550, the leader devices from the at least one groups are further grouped. For example, the first leader devices 501a, 501c, 510e, and 501g for the first groups 502a, 502b, 502c, and 502d can be grouped into at least one second group 504a and 504b. As shown, the second group 504a includes devices 501a and 501c, and the second group 504b includes devices 501e and 501g. The grouping can be performed in the manner as described with respect to 510. New identifiers can be assigned for the devices 501a, 501c, 510e, and 501g. For example, the non-volatile memory device 501a is assigned identifier 1, the non-volatile memory device 501c is assigned identifier 2, the non-volatile memory device 501e is assigned identifier 3, the non-volatile memory device 501g is assigned identifier 4. The grouping can be performed based on the updated identifiers or using another suitable method as described.

In response to grouping the leader devices at 550 (e.g., in response to grouping the first leader device into the at least one second group), the method 500 returns to 520 to determine whether the number of the groups (e.g., the at least one second group) is greater than one. In response to determining that the number of groups is greater than 1 (520: YES), the method 500 proceeds to 530.

For example, a leader device (e.g., a second leader device) is selected for each group (e.g., from second non-volatile memory devices in each of the at least one second group), at 530. In some examples, the device with an odd identifier (e.g., 1 and 3) in each of the second groups 504a and 504b is selected as the leader. Accordingly, the non-volatile memory devices 501a and 501e are selected for the groups 504a and 504b, respectively. In some examples, the device with the even identifier in each group can be selected as the leader. In some examples, the device with the smallest identifier in each group can be selected as the leader. In some examples, the device with the greatest identifier in each group can be selected as the leader.

At 540, the leader device determines the result data by performing at least one operation for the data in each group. For example, the controller 110 of second leader device of each of the at least one second group determines the second result data by performing an operation based on second data from at least one of the second non-volatile memory devices in each of the at least one second group.

For example, a buffer (e.g., the buffer 112) of the second leader device receives the second data from at least one of the second non-volatile memory devices in each of the at least one second group. The controller 110 of the second leader device 501a determines the second result data by computing the second result data based on data stored in the buffer 112 of the second leader device 501a (which can be the first result data determined by the leader device 501a) and the second data from each of the second non-volatile memory devices in each of the at least one second group. Accordingly, the first result may be an intermediate result.

For example, the controller 110 of the second leader device 501a of the group 504a performs a DMA transfer by issuing a DMA request to the controller 110 of a second non-volatile memory device 501c in the group 504a using the address of the buffer 112 of the second non-volatile memory device 501c. The data at the address of the buffer 112 of the second non-volatile memory device 501c can be read from the memory array 120 of the second non-volatile memory device 501c into the buffer 112 of the second non-volatile memory device 501b, can be received by the buffer 112 of the second non-volatile memory device 501c from the memory 102 across the interface 140, or can be a result data (e.g., first result data) from a previous iteration of the method 500. In response, the controller 110 of the second leader device 501a transfers the data stored in the buffer 112 of the second non-volatile memory device 501c into the buffer 112 of the second leader device 501a. The controller 110 of the second leader device 501a can read the data stored in the non-volatile memory (e.g., the memory array 120) of the second leader device 501a into the buffer 112 of the second leader device 501a, or the data can be a result data (e.g., the first result data) from a previous iteration of the method 500. The controller 110 of the second leader device 501a can perform the operation using the data of the second leader device 501a and the second data from the second non-volatile memory device 501c to determine the second result data. The operation includes an XOR operation where the data of the second leader device 501a is bitwise XORed with the second data from the second non-volatile memory device 501c. The second result data is stored in the buffer 112 of the second leader device 501a. The result data for the group 504b can be similarly determined by the leader device 501e.

At 550, the second leader devices 501a and 510e for the second groups 502a, 502b, 502c, and 502d can be grouped into at least one third group 506. As shown, the second group 506 includes devices 501a and 501e. The grouping can be performed in the manner as described with respect to 510. New identifiers can be assigned for the devices 501a and 510e. For example, the non-volatile memory device 501a is assigned identifier 1, the non-volatile memory device 501e is assigned identifier 2. The grouping can be performed based on the updated identifiers or using another suitable method as described.

In response to grouping the leader devices at 550 (e.g., in response to grouping the second leader devices into the third group), the method 500 proceeds to 560, in which the leader device for the group 506 is selected, according to any method disclosed herein relative to 530. At 570, the leader device determines the final result data by performing an operation based on data in the remaining group, as described relative to 540. The result data determined by the deader device of the last remaining group is deemed as the final result data.

For example, the controller 110 of the third leader device 501a of the group 506 performs a DMA transfer by issuing a DMA request to the controller 110 of a third non-volatile memory device 501e in the group 506 using the address of the buffer 112 of the c. The data at the address of the buffer 112 of the third non-volatile memory device 501e can be read from the memory array 120 of the third non-volatile memory device 501e into the buffer 112 of the third non-volatile memory device 501e, can be received by the buffer 112 of the third non-volatile memory device 501e from the memory 102 across the interface 140, or can be a result data (e.g., second result data) from a previous iteration of the method 500. In response, the controller 110 of the third leader device 501a transfers the data stored in the buffer 112 of the third non-volatile memory device 501e into the buffer 112 of the third leader device 501a. The controller 110 of the third leader device 501a can read the data stored in the non-volatile memory (e.g., the memory array 120) of the third leader device 501a into the buffer 112 of the third leader device 501a, or the data can be a result data (e.g., the second result data) from a previous iteration of the method 500. The controller 110 of the third leader device 501a can perform the operation using the data of the third leader device 501a and the third data from the third non-volatile memory device 501e to determine the third and final result data. The operation includes an XOR operation where the data of the third leader device 501a is bitwise XORed with the third data from the third non-volatile memory device 501e. The third and final result data is stored in the buffer 112 of the third leader device 501a, and can be subsequently stored in the non-volatile memory (e.g., the memory array 120) or transferred to the memory 102 over the interface 140.

In some arrangements, 510, 520, and 530 can be performed by one or more of the plurality of non-volatile memory devices. For example, at least one managing non-volatile memory device of the plurality of non-volatile memory devices or at least one managing non-volatile memory device other than the plurality of non-volatile memory devices.

The managing non-volatile memory device can receive from the host device context information for each of the plurality of non-volatile memory devices. In some examples, the device context information includes addresses or identifiers of the plurality of non-volatile memory devices which may be in the RAID group. The address of a non-volatile memory device can be a CMB address, SLM address, a PMR address, an address descriptor, an identifier, a pointer, or another suitable indicator that identifies the buffer 112 of that non-volatile memory device of the non-volatile memory device itself, as described. In some examples, the host command includes the logical address of the data subject to the operation, including the logical address (e.g., a buffer address) of the host for the data. In some examples, the device context information can include permission information of at least one of the plurality of non-volatile memory devices or their buffers 112. In some examples, the device context information can include priority information including at least one of a priority level for processing the data (e.g., the group-based calculations) by each of the plurality of non-volatile memory devices or a priority level for the managing non-volatile memory device or the leader device to communicate with each of the plurality of non-volatile memory devices with respect to the data in connection with the group-based calculations. The managing non-volatile memory device can communicate with one or more of the plurality of non-volatile memory device using the addresses and permission information in the device context information. The managing non-volatile memory device can communicate the group (e.g., the identifier assignment) to all of the plurality of non-volatile memory devices or the non-volatile memory devices in the same group as the managing non-volatile memory device. The managing non-volatile memory device can determine whether the number of group is greater than 1 at 520 and notify the remaining leader devices whether additional operations need to be performed. At 530, one managing non-volatile memory device may select the leaders for all groups, or a different managing non-volatile memory device may select the leader for each group. Various implementations relate to grouping a plurality of non-volatile memory devices into at least one first group, determining that a number of the at least one first group is greater than 1, selecting a first leader device from first non-volatile memory devices in each of the at least one first group, and determining first result data by performing an operation based on first data from at least one of the first non-volatile memory devices in each of the at least one first group.

The method 500 can reduce the workload of the processor 104 by dividing the work of the processor 104 among device controllers 110. The method 500 can reduce the amount of data passing across the root complex 105 due to the transfer of the data being within the PCIe subsystem (e.g., in the bus 106). The method 500 can reduce the load on system memory 102 by using the buffer 112 to restore intermediate results.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical drive storage, magnetic drive storage or other magnetic storages, or any other medium that may be used to store desired program code in the form of instructions or data structures and that may be accessed by a computer. Drive and disc, as used herein, includes compact disc (CD), laser disc, optical disc, digital versatile disc (DVD), floppy drive, and blu-ray disc where drives usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
    receiving, by a first non-volatile memory device from a host, a host command comprising device context information of a second non-volatile memory device, wherein the device context comprises an address of a buffer of the second non-volatile memory device;
    transferring, by the first non-volatile memory device, data corresponding to the host command from the host to a buffer of the first non-volatile memory device; and
    sending, by the first non-volatile memory device to the second non-volatile memory device, a peer command based on the device context information.

2. The method of claim 1, wherein the device context information comprises permission information of at least one of the second non-volatile memory device or the buffer of the at least one second non-volatile memory device.

3. The method of claim 2, wherein the permission information comprises one or more types of operations for which the second non-volatile memory device or a buffer of the second non-volatile memory device is permitted to be accessed by the first non-volatile memory device.

4. The method of claim 2, wherein the permission information comprises authentication credentials to the second non-volatile memory device or a buffer of the second non-volatile memory device.

5. The method of claim 4, wherein the authentication credentials are implemented using an control access list.

6. The method of claim 1, wherein the device context information comprises priority information for processing the data corresponding to the host command.

7. The method of claim 6, wherein the priority information comprises a priority level of the data in processing the data by the first non-volatile memory device.

8. The method of claim 6, wherein the priority information comprises a priority level of the data in processing the data by the second non-volatile memory device.

9. The method of claim 1, wherein
the host command comprises a first write command; and
the peer command comprises a second write command comprising an address of the buffer of the first non-volatile memory device, wherein the data is transferred from the buffer of the first non-volatile memory device to the buffer of the second non-volatile memory device.

10. The method of claim 9, wherein
the second non-volatile memory device comprises a plurality of non-volatile memory device;
sending the peer command to the second non-volatile memory device comprises sending the peer command to each of the plurality of non-volatile memory device, wherein the data is transferred from the buffer of the first non-volatile memory device to a buffer of each of the plurality of non-volatile memory devices.

11. The method of claim 10, wherein the plurality of non-volatile memory device writes the data from the respective buffer to a respective non-volatile memory in parallel.

12. The method of claim 1, wherein the data comprises new data, the method further comprising:
reading, by the first non-volatile memory device from a non-volatile memory of the first non-volatile memory device, old data corresponding to the new data;
determining, by the first non-volatile memory device, a result data using an operation based on the old data and the new data.

13. The method of claim 12, wherein
the host command comprises a first write command; and
the peer command comprises a second write command comprising an address of the buffer of the first non-volatile memory device, wherein the result data is transferred from the buffer of the first non-volatile memory device to the buffer of the second non-volatile memory device.

14. A system, comprising:
a first non-volatile memory device comprising a buffer, a non-volatile memory, and a controller, wherein the controller is configured to:
receive, from a host, a host command comprising device context information of a second non-volatile memory device, wherein the device context comprises an address of a buffer of the second non-volatile memory device;
transfer data corresponding to the host command from the host to the buffer of the first non-volatile memory device; and
send to the second non-volatile memory device a peer command based on the device context information.

15. The system of claim 14, wherein
the host command comprises a first write command; and
the peer command comprises a second write command comprising an address of the buffer of the first non-volatile memory device, wherein the data is transferred from the buffer of the first non-volatile memory device to the buffer of the second non-volatile memory device.

16. The system of claim 14, wherein the data comprises new data, and the controller is further configured to
read from the non-volatile memory of the first non-volatile memory device old data corresponding to the new data;
determine a result data using an operation based on the old data and the new data.

17. The system of claim 16, wherein
the host command comprises a first write command; and
the peer command comprises a second write command comprising an address of the buffer of the first non-volatile memory device, wherein the result data is transferred from the buffer of the first non-volatile memory device to the buffer of the second non-volatile memory device.

18. A non-transitory processor-readable medium comprising processor-readable instructions, such that, when executed, causes a controller of a first non-volatile memory device to:
receive, from a host, a host command comprising device context information of a second non-volatile memory device, wherein the device context comprises an address of a buffer of the second non-volatile memory device;
transfer data corresponding to the host command from the host to the buffer of the first non-volatile memory device; and
send to the second non-volatile memory device a peer command based on the device context information.

19. The non-transitory processor-readable medium of claim 18, wherein
the host command comprises a first write command; and
the peer command comprises a second write command comprising an address of the buffer of the first non-volatile memory device, wherein the data is transferred from the buffer of the first non-volatile memory device to the buffer of the second non-volatile memory device.

20. The non-transitory processor-readable medium of claim 18 wherein the data comprises new data, and the controller is further configured to
read from the non-volatile memory of the first non-volatile memory device old data corresponding to the new data;
determine a result data using an operation based on the old data and the new data.

* * * * *